(12) United States Patent
Salahieh et al.

(10) Patent No.: US 12,521,232 B2
(45) Date of Patent: Jan. 13, 2026

(54) ACCOMMODATING INTRAOCULAR LENSES AND ASSOCIATED METHODS

(71) Applicant: Shifamed Holdings, LLC, Campbell, CA (US)

(72) Inventors: Amr Salahieh, Saratoga, CA (US); Mariam Maghribi, Los Gatos, CA (US); Claudio Argento, Felton, CA (US); Tom Saul, Moss Beach, CA (US); Cornelius Matthew Crowley, San Francisco, CA (US); Juan Diego Perea, San Jose, CA (US); John Scholl, San Ramon, CA (US)

(73) Assignee: Shifamed Holdings, LLC, Campbell, CA (US)

( * ) Notice: Subject to any disclaimer, the term of this patent is extended or adjusted under 35 U.S.C. 154(b) by 1008 days.

(21) Appl. No.: 17/625,216

(22) PCT Filed: Jul. 10, 2020

(86) PCT No.: PCT/US2020/041644
§ 371 (c)(1),
(2) Date: Jan. 6, 2022

(87) PCT Pub. No.: WO2021/007535
PCT Pub. Date: Jan. 14, 2021

(65) Prior Publication Data
US 2022/0296362 A1    Sep. 22, 2022

Related U.S. Application Data

(60) Provisional application No. 62/976,863, filed on Feb. 14, 2020, provisional application No. 62/873,092, filed on Jul. 11, 2019.

(51) Int. Cl.
*A61F 2/16* (2006.01)
*A61B 3/16* (2006.01)

(52) U.S. Cl.
CPC .............. *A61F 2/1635* (2013.01); *A61B 3/16* (2013.01); *A61F 2002/1682* (2015.04); *A61F 2002/169* (2015.04); *A61F 2250/0002* (2013.01)

(58) Field of Classification Search
CPC .. A61F 2002/1681; A61F 2/16; A61F 2/1648; A61F 2/1629
See application file for complete search history.

(56) References Cited

U.S. PATENT DOCUMENTS

| | | | |
|---|---|---|---|
| 4,440,918 | A | 4/1984 | Rice et al. |
| 4,663,409 | A | 5/1987 | Friends et al. |

(Continued)

FOREIGN PATENT DOCUMENTS

| | | |
|---|---|---|
| AU | 2006200142 A1 | 7/2006 |
| AU | 2015361227 | 4/2017 |

(Continued)

OTHER PUBLICATIONS

International Search Report and Written Opinion for PCT Application No. PCT/US2024/017704, Applicant: Shifamed Holdings, LLC, Date of Mailing: Aug. 28, 2024, 11 pages.

(Continued)

*Primary Examiner* — Seema Mathew
(74) *Attorney, Agent, or Firm* — Perkins Coie LLP

(57) ABSTRACT

An accommodating intraocular lens (AIOL) can include an accommodating lens structure having an accommodating optical power. The AIOL can include a secondary structure removably connected to the accommodating lens. In some embodiments, the accommodating lens structure is configured to adjust the accommodating optical power in response to radial forces from the capsule of a patient. The secondary structure can be a sensor assembly, a powered lens and/or a light-adjustable lens. In some embodiments, the accommo- (Continued)

dating lens structure comprises an outer fluid reservoir and a fluid accommodating lens in fluid communication with the outer fluid reservoir. The outer fluid reservoir can be configured to transfer fluid into the fluid accommodating lens in reaction to compressive forces on the outer fluid reservoir.

20 Claims, 5 Drawing Sheets

(56) References Cited

U.S. PATENT DOCUMENTS

| | | |
|---|---|---|
| 4,709,996 A | 12/1987 | Michelson et al. |
| 4,731,078 A | 3/1988 | Stoy et al. |
| 4,731,080 A | 3/1988 | Galin |
| 4,842,601 A | 6/1989 | Smith et al. |
| 4,892,543 A | 1/1990 | Turley |
| 4,932,966 A | 6/1990 | Mcmaster et al. |
| 4,932,971 A | 6/1990 | Kelman |
| 5,074,942 A | 12/1991 | Orlosky et al. |
| 5,211,662 A | 5/1993 | Barrett et al. |
| 5,217,491 A | 6/1993 | Vanderbilt |
| 5,366,502 A | 11/1994 | Patel |
| 5,405,386 A | 4/1995 | Rheinish et al. |
| 5,423,929 A | 6/1995 | Grisoni et al. |
| 5,489,302 A | 2/1996 | Skottun |
| 5,556,929 A | 9/1996 | Yokoyama et al. |
| 5,612,391 A | 3/1997 | Chabrecek et al. |
| 5,620,720 A | 4/1997 | Glick et al. |
| 5,807,944 A | 9/1998 | Hirt et al. |
| 5,891,931 A | 4/1999 | Leboeuf et al. |
| 5,914,355 A | 6/1999 | Kuenzler |
| 5,944,753 A | 8/1999 | Galin et al. |
| 5,945,465 A | 8/1999 | Ozark et al. |
| 5,945,498 A | 8/1999 | Lohmann et al. |
| 6,140,438 A | 10/2000 | Kawaguchi et al. |
| 6,197,059 B1 | 3/2001 | Cumming |
| 6,346,594 B1 | 2/2002 | Watanabe et al. |
| 6,447,920 B1 | 9/2002 | Chabrecek et al. |
| 6,465,056 B1 | 10/2002 | Chabrecek et al. |
| 6,521,352 B1 | 2/2003 | Lohmann et al. |
| 6,537,316 B1 | 3/2003 | Chambers |
| 6,558,420 B2 | 5/2003 | Green et al. |
| 6,582,754 B1 | 6/2003 | Pasic et al. |
| 6,586,038 B1 | 7/2003 | Chabrecek et al. |
| 6,630,243 B2 | 10/2003 | Ozark et al. |
| 6,660,035 B1 | 12/2003 | Yaross et al. |
| 6,685,741 B2 | 2/2004 | Landreville et al. |
| 6,695,881 B2 | 2/2004 | Peng et al. |
| 6,713,583 B2 | 3/2004 | Liao et al. |
| 6,730,123 B1 | 5/2004 | Klopotek et al. |
| 6,734,321 B2 | 5/2004 | Chabrecek et al. |
| 6,747,090 B2 | 6/2004 | Haitjema et al. |
| 6,761,737 B2 | 7/2004 | Ting et al. |
| 6,764,511 B2 | 7/2004 | Ting et al. |
| 6,767,363 B1 | 7/2004 | Green et al. |
| 6,767,979 B1 | 7/2004 | Muir et al. |
| 6,786,934 B2 | 9/2004 | Ting et al. |
| 6,797,004 B1 | 9/2004 | Brady et al. |
| 6,818,017 B1 | 11/2004 | Shu et al. |
| 6,818,158 B2 | 11/2004 | Pham et al. |
| 6,835,410 B2 | 12/2004 | Chabrecek et al. |
| 6,846,326 B2 | 1/2005 | Nguyen et al. |
| 6,858,040 B2 | 2/2005 | Ting et al. |
| 6,884,261 B2 | 4/2005 | Zadno-Azizi et al. |
| 6,893,595 B1 | 5/2005 | Muir et al. |
| 6,893,685 B2 | 5/2005 | Pasic et al. |
| 6,899,732 B2 | 5/2005 | Zadno-Azizi et al. |
| 6,935,743 B2 | 8/2005 | Shadduck |
| 6,969,403 B2 | 11/2005 | Yang et al. |
| 7,041,134 B2 | 5/2006 | Ting et al. |
| 7,087,080 B2 | 8/2006 | Ting et al. |
| 7,097,660 B2 | 8/2006 | Portney |
| 7,118,596 B2 | 10/2006 | Ting et al. |
| 7,198,640 B2 | 4/2007 | Nguyen |
| 7,217,288 B2 | 5/2007 | Esch et al. |
| 7,217,778 B2 | 5/2007 | Flipsen et al. |
| 7,223,288 B2 | 5/2007 | Zhang et al. |
| 7,226,478 B2 | 6/2007 | Ting et al. |
| 7,300,464 B2 | 11/2007 | Tran |
| 7,416,562 B2 | 8/2008 | Gross et al. |
| 7,438,723 B2 | 10/2008 | Esch |
| 7,452,378 B2 | 11/2008 | Ting et al. |
| 7,468,397 B2 | 12/2008 | Schorzman et al. |
| 7,479,530 B2 | 1/2009 | Chan et al. |
| 7,557,231 B2 | 7/2009 | Schorzman et al. |
| 7,588,334 B2 | 9/2009 | Matsushita et al. |
| 7,591,849 B2 | 9/2009 | Richardson et al. |
| 7,601,766 B2 | 10/2009 | Schorzman et al. |
| 7,637,947 B2 | 12/2009 | Scholl et al. |
| 7,699,468 B2 | 4/2010 | Gaida |
| 7,714,090 B2 | 5/2010 | Iwamoto et al. |
| 7,744,603 B2 | 6/2010 | Zadno-Azizi et al. |
| 7,744,646 B2 | 6/2010 | Zadno-Azizi et al. |
| 7,781,558 B2 | 8/2010 | Schorzman et al. |
| 7,806,929 B2 | 10/2010 | Brown et al. |
| 7,806,930 B2 | 10/2010 | Brown et al. |
| 7,842,087 B2 | 11/2010 | Ben |
| 7,883,540 B2 | 2/2011 | Niwa et al. |
| 7,906,563 B2 | 3/2011 | Huang et al. |
| 7,942,929 B2 | 5/2011 | Linhardt et al. |
| 8,003,710 B2 | 8/2011 | Medina et al. |
| 8,025,823 B2 | 9/2011 | Figueroa et al. |
| 8,034,107 B2 | 10/2011 | Stenger et al. |
| 8,048,155 B2 | 11/2011 | Shadduck et al. |
| 8,071,703 B2 | 12/2011 | Zhou et al. |
| 8,105,623 B2 | 1/2012 | Schorzman et al. |
| 8,158,712 B2 | 4/2012 | Your |
| 8,187,325 B2 | 5/2012 | Zadno-Azizi et al. |
| 8,211,955 B2 | 7/2012 | Chang et al. |
| 8,222,360 B2 | 7/2012 | Liao |
| 8,251,509 B2 | 8/2012 | Zickler et al. |
| 8,283,429 B2 | 10/2012 | Zhou et al. |
| 8,328,869 B2 | 12/2012 | Burns et al. |
| 8,357,771 B2 | 1/2013 | Medina et al. |
| 8,377,123 B2 | 2/2013 | Zadno et al. |
| 8,414,646 B2 | 4/2013 | Gifford et al. |
| 8,419,790 B1 | 4/2013 | Sabti |
| 8,420,711 B2 | 4/2013 | Awasthi et al. |
| 8,425,595 B2 | 4/2013 | Evans et al. |
| 8,425,599 B2 | 4/2013 | Shadduck et al. |
| 8,425,926 B2 | 4/2013 | Qiu et al. |
| 8,430,928 B2 | 4/2013 | Liao |
| 8,454,688 B2 | 6/2013 | Evans et al. |
| 8,486,142 B2 | 7/2013 | Bumbalough et al. |
| 8,500,806 B1 | 8/2013 | Phillips et al. |
| 8,585,758 B2 | 11/2013 | Woods |
| 8,603,166 B2 | 12/2013 | Park |
| 8,609,745 B2 | 12/2013 | Medina et al. |
| 8,663,510 B2 | 3/2014 | Graney et al. |
| 8,680,172 B2 | 3/2014 | Liao |
| 8,728,158 B2 | 5/2014 | Whitsett |
| 8,759,414 B2 | 6/2014 | Winter et al. |
| 8,771,347 B2 | 7/2014 | DeBoer et al. |
| 8,784,485 B2 | 7/2014 | Evans et al. |
| 8,827,447 B2 | 9/2014 | Awasthi et al. |
| 8,834,566 B1 | 9/2014 | Jones |
| 8,835,525 B2 | 9/2014 | Chang et al. |
| 8,851,670 B2 | 10/2014 | Zickler et al. |
| 8,863,749 B2 | 10/2014 | Gooding et al. |
| 8,877,227 B2 | 11/2014 | Ravi |
| 8,899,745 B2 | 12/2014 | Domschke |
| 8,900,298 B2 | 12/2014 | Chazan et al. |
| 8,956,409 B2 | 2/2015 | Ben |
| 8,968,399 B2 | 3/2015 | Ghabra |
| 8,992,609 B2 | 3/2015 | Shadduck |
| 8,993,651 B2 | 3/2015 | Chang et al. |
| 9,005,492 B2 | 4/2015 | Chang et al. |
| 9,005,700 B2 | 4/2015 | Qiu et al. |
| 9,006,359 B2 | 4/2015 | Schultz et al. |
| 9,011,532 B2 | 4/2015 | Catlin et al. |
| 9,023,915 B2 | 5/2015 | Hu et al. |
| 9,034,035 B2 | 5/2015 | Assia et al. |
| 9,039,174 B2 | 5/2015 | Awasthi et al. |

(56) References Cited

U.S. PATENT DOCUMENTS

| | | |
|---|---|---|
| 9,044,302 B2 | 6/2015 | Gooding et al. |
| 9,052,439 B2 | 6/2015 | Samuel et al. |
| 9,052,440 B2 | 6/2015 | Chang et al. |
| 9,095,424 B2 | 8/2015 | Atkinson et al. |
| 9,097,840 B2 | 8/2015 | Chang et al. |
| 9,125,736 B2 | 9/2015 | Atkinson et al. |
| 9,186,244 B2 | 11/2015 | Rao et al. |
| 9,198,572 B2 | 12/2015 | Zickler et al. |
| 9,198,752 B2 | 12/2015 | Woods |
| 9,254,189 B2 | 2/2016 | Azar et al. |
| 9,265,604 B2 | 2/2016 | Woods |
| 9,277,988 B1 | 3/2016 | Chu |
| 9,280,000 B2 | 3/2016 | Simonov et al. |
| 9,289,287 B2 | 3/2016 | Atkinson et al. |
| 9,326,848 B2 | 5/2016 | Woods |
| 9,364,316 B1 | 6/2016 | Kahook et al. |
| 9,387,069 B2 | 7/2016 | Atkinson et al. |
| 9,398,949 B2 | 7/2016 | Werblin |
| 9,421,088 B1 | 8/2016 | Schieber et al. |
| 9,427,312 B2 | 8/2016 | Tai et al. |
| 9,433,497 B2 | 9/2016 | DeBoer et al. |
| 9,456,895 B2 | 10/2016 | Shadduck et al. |
| 9,486,311 B2 | 11/2016 | Vaughan et al. |
| 9,498,326 B2 | 11/2016 | Tsai et al. |
| 9,603,703 B2 | 3/2017 | Bumbalough |
| 9,622,855 B2 | 4/2017 | Portney et al. |
| 9,636,213 B2 | 5/2017 | Brady |
| 9,655,775 B2 | 5/2017 | Boukhny et al. |
| 9,681,946 B2 | 6/2017 | Kahook et al. |
| 9,693,858 B2 | 7/2017 | Hildebrand et al. |
| 9,713,527 B2 | 7/2017 | Nishi et al. |
| 9,744,027 B2 | 8/2017 | Jansen |
| 9,795,473 B2 | 10/2017 | Smiley et al. |
| 9,814,568 B2 | 11/2017 | Ben Nun |
| 9,907,881 B2 | 3/2018 | Terrisse |
| 10,195,018 B2 | 2/2019 | Salahieh et al. |
| 10,350,057 B2 | 7/2019 | Argento et al. |
| 10,526,353 B2 | 1/2020 | Silvestrini |
| 10,548,718 B2 | 2/2020 | Salahieh et al. |
| 10,709,549 B2 | 7/2020 | Argento et al. |
| 10,736,734 B2 | 8/2020 | Salahieh et al. |
| 11,141,263 B2 | 10/2021 | Argento et al. |
| 11,311,418 B2 | 4/2022 | Dick et al. |
| 11,464,625 B2 | 10/2022 | Link et al. |
| 11,540,916 B2 | 1/2023 | Salahieh et al. |
| 11,583,390 B2 | 2/2023 | Salahieh et al. |
| 12,167,960 B2 | 12/2024 | Argento et al. |
| 12,251,303 B2 | 3/2025 | Salahieh et al. |
| 2001/0037001 A1 | 11/2001 | Muller et al. |
| 2001/0056165 A1 | 12/2001 | Mentak et al. |
| 2002/0055776 A1 | 5/2002 | Juan, Jr. et al. |
| 2002/0072795 A1 | 6/2002 | Green et al. |
| 2002/0086160 A1 | 7/2002 | Qiu et al. |
| 2002/0102415 A1 | 8/2002 | Valint, Jr. et al. |
| 2002/0103536 A1 | 8/2002 | Landreville et al. |
| 2002/0107568 A1 | 8/2002 | Zadno-Azizi et al. |
| 2002/0111678 A1 | 8/2002 | Zadno-Azizi et al. |
| 2002/0116057 A1 | 8/2002 | Ting et al. |
| 2002/0116058 A1 | 8/2002 | Zadno-Azizi et al. |
| 2002/0116059 A1 | 8/2002 | Zadno-Azizi et al. |
| 2002/0116060 A1 | 8/2002 | Nguyen et al. |
| 2002/0116061 A1 | 8/2002 | Zadno-Azizi et al. |
| 2002/0138141 A1 | 9/2002 | Zadno-Azizi et al. |
| 2002/0173847 A1 | 11/2002 | Pham et al. |
| 2002/0182316 A1 | 12/2002 | Gilliard et al. |
| 2002/0197414 A1 | 12/2002 | Chabrecek et al. |
| 2003/0008063 A1 | 1/2003 | Chabrecek et al. |
| 2003/0074060 A1 | 4/2003 | Zadno-Azizi et al. |
| 2003/0074061 A1 | 4/2003 | Pham et al. |
| 2003/0078656 A1 | 4/2003 | Nguyen |
| 2003/0078657 A1 | 4/2003 | Zadno-Azizi et al. |
| 2003/0078658 A1 | 4/2003 | Zadno-Azizi |
| 2003/0100666 A1 | 5/2003 | DeGroot et al. |
| 2003/0158560 A1 | 8/2003 | Portney |
| 2003/0162929 A1 | 8/2003 | Verbruggen et al. |
| 2003/0224185 A1 | 12/2003 | Valint, Jr. et al. |
| 2004/0082993 A1 | 4/2004 | Woods |
| 2004/0111152 A1 | 6/2004 | Kelman et al. |
| 2004/0166232 A1 | 8/2004 | Kunzler et al. |
| 2004/0169816 A1 | 9/2004 | Esch |
| 2004/0184158 A1 | 9/2004 | Shadduck |
| 2004/0230300 A1 | 11/2004 | Bandhauer et al. |
| 2005/0013842 A1 | 1/2005 | Qiu et al. |
| 2005/0049700 A1 | 3/2005 | Zadno-Azizi et al. |
| 2005/0055092 A1 | 3/2005 | Nguyen et al. |
| 2005/0107875 A1 | 5/2005 | Cumming |
| 2005/0119740 A1 | 6/2005 | Esch et al. |
| 2005/0149183 A1 | 7/2005 | Shadduck et al. |
| 2005/0153055 A1 | 7/2005 | Ammon et al. |
| 2005/0165410 A1 | 7/2005 | Zadno-Azizi et al. |
| 2005/0228120 A1 | 10/2005 | Hughes et al. |
| 2005/0228401 A1 | 10/2005 | Zadno-Azizi et al. |
| 2006/0069432 A1 | 3/2006 | Tran |
| 2006/0085013 A1 | 4/2006 | Dusek et al. |
| 2006/0100701 A1 | 5/2006 | Esch et al. |
| 2006/0100703 A1 | 5/2006 | Evans et al. |
| 2006/0116765 A1 | 6/2006 | Blake et al. |
| 2006/0178741 A1 | 8/2006 | Zadno-Azizi et al. |
| 2006/0241752 A1 | 10/2006 | Israel |
| 2006/0259139 A1 | 11/2006 | Zadno-Azizi et al. |
| 2006/0271187 A1 | 11/2006 | Zadno-Azizi et al. |
| 2007/0005135 A1 | 1/2007 | Makker et al. |
| 2007/0027540 A1 | 2/2007 | Zadno-Azizi et al. |
| 2007/0050025 A1 | 3/2007 | Nguyen et al. |
| 2007/0078515 A1 | 4/2007 | Brady |
| 2007/0088433 A1 | 4/2007 | Esch et al. |
| 2007/0092830 A1 | 4/2007 | Lai et al. |
| 2007/0106377 A1 | 5/2007 | Smith et al. |
| 2007/0108643 A1 | 5/2007 | Zadno-Azizi et al. |
| 2007/0122540 A1 | 5/2007 | Salamone et al. |
| 2007/0201138 A1 | 8/2007 | Lo et al. |
| 2007/0203317 A1 | 8/2007 | Verbruggen et al. |
| 2007/0213817 A1 | 9/2007 | Esch et al. |
| 2007/0232755 A1 | 10/2007 | Matsushita et al. |
| 2007/0244561 A1 | 10/2007 | Ben Nun |
| 2007/0269488 A1 | 11/2007 | Ravi et al. |
| 2008/0001318 A1 | 1/2008 | Schorzman et al. |
| 2008/0003259 A1 | 1/2008 | Salamone et al. |
| 2008/0003261 A1 | 1/2008 | Schorzman et al. |
| 2008/0015689 A1 | 1/2008 | Esch et al. |
| 2008/0027461 A1 | 1/2008 | Vaquero et al. |
| 2008/0046074 A1 | 2/2008 | Smith et al. |
| 2008/0076897 A1 | 3/2008 | Kunzler et al. |
| 2008/0139769 A1 | 6/2008 | Iwamoto et al. |
| 2008/0143958 A1 | 6/2008 | Medina et al. |
| 2008/0181931 A1 | 7/2008 | Qiu et al. |
| 2008/0234457 A1 | 9/2008 | Zhou et al. |
| 2008/0300680 A1 | 12/2008 | Joshua et al. |
| 2008/0306587 A1* | 12/2008 | Your .................. A61L 27/16 522/182 |
| 2008/0306588 A1* | 12/2008 | Smiley .................. A61F 2/1629 623/6.13 |
| 2008/0314767 A1 | 12/2008 | Lai et al. |
| 2009/0005864 A1 | 1/2009 | Eggleston |
| 2009/0005865 A1 | 1/2009 | Smiley et al. |
| 2009/0043384 A1 | 2/2009 | Niwa et al. |
| 2009/0076603 A1 | 3/2009 | Avery et al. |
| 2009/0118739 A1 | 5/2009 | Kappelhof et al. |
| 2009/0131861 A1 | 5/2009 | Braig et al. |
| 2009/0143499 A1 | 6/2009 | Chang et al. |
| 2009/0168012 A1 | 7/2009 | Linhardt et al. |
| 2009/0170976 A1 | 7/2009 | Huang et al. |
| 2009/0171459 A1 | 7/2009 | Linhardt et al. |
| 2009/0204210 A1 | 8/2009 | Pynson |
| 2009/0232871 A1 | 9/2009 | Hitz et al. |
| 2009/0247661 A1 | 10/2009 | Müller-Lierheim et al. |
| 2009/0292355 A1 | 11/2009 | Boyd et al. |
| 2010/0016964 A1 | 1/2010 | Werblin |
| 2010/0119744 A1 | 5/2010 | Yokoyama et al. |
| 2010/0120938 A1 | 5/2010 | Phelan et al. |
| 2010/0120939 A1 | 5/2010 | Phelan et al. |
| 2010/0121444 A1 | 5/2010 | Ben Nun et al. |
| 2010/0160482 A1 | 6/2010 | Nachbaur et al. |
| 2010/0179653 A1 | 7/2010 | Argento et al. |

(56) References Cited

U.S. PATENT DOCUMENTS

| | | |
|---|---|---|
| 2010/0211170 A1 | 8/2010 | Liao et al. |
| 2010/0228346 A1 | 9/2010 | Esch et al. |
| 2010/0239633 A1 | 9/2010 | Strome et al. |
| 2010/0324674 A1 | 12/2010 | Brown et al. |
| 2011/0009519 A1 | 1/2011 | Awasthi et al. |
| 2011/0046332 A1 | 2/2011 | Breiner et al. |
| 2011/0112636 A1 | 5/2011 | Ben Nun |
| 2011/0118379 A1 | 5/2011 | Tighe et al. |
| 2011/0118834 A1 | 5/2011 | Lo et al. |
| 2011/0133350 A1 | 6/2011 | Qiu et al. |
| 2011/0140292 A1 | 6/2011 | Chang et al. |
| 2011/0144228 A1 | 6/2011 | Ravi et al. |
| 2011/0264209 A1 | 10/2011 | Wiechmann et al. |
| 2011/0269869 A1 | 11/2011 | Medina et al. |
| 2011/0282442 A1 | 11/2011 | Scholl et al. |
| 2011/0295368 A1 | 12/2011 | Betser et al. |
| 2012/0010321 A1 | 1/2012 | Chang et al. |
| 2012/0023869 A1 | 2/2012 | Samuel et al. |
| 2012/0033183 A1 | 2/2012 | Dai et al. |
| 2012/0041097 A1 | 2/2012 | Zhou et al. |
| 2012/0046743 A1 | 2/2012 | Pinchuk et al. |
| 2012/0063000 A1 | 3/2012 | Batchko et al. |
| 2012/0078363 A1 | 3/2012 | Lu |
| 2012/0078364 A1 | 3/2012 | Stenger |
| 2012/0088843 A1 | 4/2012 | Chang et al. |
| 2012/0088844 A1 | 4/2012 | Kuyu et al. |
| 2012/0088861 A1 | 4/2012 | Huang et al. |
| 2012/0115979 A1 | 5/2012 | Chang et al. |
| 2012/0147323 A1 | 6/2012 | Domschke et al. |
| 2012/0238857 A1 | 9/2012 | Wong et al. |
| 2012/0245684 A1 | 9/2012 | Liao et al. |
| 2012/0314183 A1 | 12/2012 | Nakamura et al. |
| 2012/0330415 A1 | 12/2012 | Callahan et al. |
| 2013/0013060 A1 | 1/2013 | Zadno-Azizi et al. |
| 2013/0053954 A1 | 2/2013 | Rao et al. |
| 2013/0095235 A1 | 4/2013 | Bothe et al. |
| 2013/0106007 A1 | 5/2013 | Medina et al. |
| 2013/0110234 A1 | 5/2013 | DeVita et al. |
| 2013/0116781 A1 | 5/2013 | Ben Nun et al. |
| 2013/0131794 A1* | 5/2013 | Smiley .................. A61F 2/1613 623/6.37 |
| 2013/0150961 A1 | 6/2013 | Evans et al. |
| 2013/0165943 A1 | 6/2013 | Downer |
| 2013/0176628 A1 | 7/2013 | Batchko et al. |
| 2013/0197125 A1 | 8/2013 | Awasthi et al. |
| 2013/0224309 A1 | 8/2013 | Qiu et al. |
| 2013/0226193 A1 | 8/2013 | Kudo et al. |
| 2013/0228943 A1 | 9/2013 | Qiu et al. |
| 2013/0245756 A1 | 9/2013 | Liao et al. |
| 2013/0289294 A1 | 10/2013 | Awasthi et al. |
| 2013/0304203 A1 | 11/2013 | Beer |
| 2013/0317607 A1 | 11/2013 | DeBoer et al. |
| 2014/0052246 A1 | 2/2014 | Kahook et al. |
| 2014/0055750 A1 | 2/2014 | Dai et al. |
| 2014/0171539 A1 | 6/2014 | Chang et al. |
| 2014/0171542 A1 | 6/2014 | Chang |
| 2014/0178595 A1 | 6/2014 | Bothe et al. |
| 2014/0180403 A1 | 6/2014 | Silvestrini et al. |
| 2014/0180404 A1 | 6/2014 | Tran |
| 2014/0180406 A1 | 6/2014 | Simpson |
| 2014/0180407 A1 | 6/2014 | Sohn et al. |
| 2014/0228949 A1 | 8/2014 | Argento et al. |
| 2014/0277437 A1 | 9/2014 | Currie |
| 2014/0277439 A1 | 9/2014 | Hu et al. |
| 2014/0309735 A1 | 10/2014 | Sohn et al. |
| 2014/0316521 A1 | 10/2014 | McLeod et al. |
| 2014/0350124 A1 | 11/2014 | Frank et al. |
| 2014/0379079 A1 | 12/2014 | Ben Nun |
| 2015/0088149 A1 | 3/2015 | Auld |
| 2015/0092155 A1 | 4/2015 | Chang et al. |
| 2015/0105760 A1 | 4/2015 | Silvestrini et al. |
| 2015/0152228 A1 | 6/2015 | Chang et al. |
| 2015/0164321 A1 | 6/2015 | Weibel et al. |
| 2015/0173892 A1 | 6/2015 | Borja et al. |
| 2015/0177417 A1 | 6/2015 | Goshima et al. |
| 2015/0297290 A1 | 10/2015 | Beeckler et al. |
| 2015/0342726 A1 | 12/2015 | Deacon et al. |
| 2015/0351901 A1 | 12/2015 | Chicevic et al. |
| 2016/0000558 A1 | 1/2016 | Honigsbaum et al. |
| 2016/0008126 A1 | 1/2016 | Vaughan et al. |
| 2016/0030161 A1 | 2/2016 | Rao et al. |
| 2016/0058553 A1 | 3/2016 | Salahieh et al. |
| 2016/0063898 A1 | 3/2016 | Bernal |
| 2016/0074154 A1 | 3/2016 | Woods |
| 2016/0100938 A1 | 4/2016 | Weeber et al. |
| 2016/0128826 A1 | 5/2016 | Rao et al. |
| 2016/0151150 A1 | 6/2016 | Sato |
| 2016/0184091 A1 | 6/2016 | Burns et al. |
| 2016/0184092 A1 | 6/2016 | Flaherty et al. |
| 2016/0184136 A1 | 6/2016 | Bor et al. |
| 2016/0220351 A1 | 8/2016 | Dorronsoro Diaz et al. |
| 2016/0250020 A1 | 9/2016 | Schieber et al. |
| 2016/0256265 A1 | 9/2016 | Borja et al. |
| 2016/0256316 A1 | 9/2016 | Van Noy et al. |
| 2016/0262875 A1 | 9/2016 | Smiley et al. |
| 2016/0278914 A1 | 9/2016 | Sato et al. |
| 2016/0296320 A1 | 10/2016 | Humayun et al. |
| 2016/0296662 A1 | 10/2016 | Dudic et al. |
| 2016/0317286 A1 | 11/2016 | Rao et al. |
| 2016/0317287 A1 | 11/2016 | Rao et al. |
| 2016/0331587 A1 | 11/2016 | Ueno et al. |
| 2016/0361157 A1 | 12/2016 | Honigsbaum |
| 2017/0000602 A1 | 1/2017 | Sohn et al. |
| 2017/0020662 A1 | 1/2017 | Shadduck |
| 2017/0049561 A1 | 2/2017 | Smiley et al. |
| 2017/0049562 A1 | 2/2017 | Argento et al. |
| 2017/0119521 A1 | 5/2017 | Kahook et al. |
| 2017/0172727 A1 | 6/2017 | Kanner et al. |
| 2017/0181850 A1 | 6/2017 | de Juan, Jr. et al. |
| 2017/0258581 A1 | 9/2017 | Borja et al. |
| 2017/0348094 A1 | 12/2017 | Sohn et al. |
| 2017/0367817 A1 | 12/2017 | Belisle et al. |
| 2018/0085213 A1 | 3/2018 | Hadba et al. |
| 2018/0110613 A1 | 4/2018 | Wortz et al. |
| 2018/0161152 A1 | 6/2018 | Argento et al. |
| 2018/0177589 A1* | 6/2018 | Argento ................ A61F 2/1635 |
| 2018/0271645 A1 | 9/2018 | Brady et al. |
| 2019/0159890 A1 | 5/2019 | Salahieh et al. |
| 2019/0175015 A1 | 6/2019 | Adams et al. |
| 2019/0274823 A1 | 9/2019 | Argento et al. |
| 2019/0290422 A1 | 9/2019 | Ben Nun |
| 2019/0307552 A1 | 10/2019 | Wortz et al. |
| 2019/0365567 A1 | 12/2019 | Balkenbush et al. |
| 2019/0374334 A1 | 12/2019 | Brady et al. |
| 2020/0121447 A1 | 4/2020 | Argento et al. |
| 2020/0146813 A1 | 5/2020 | Argento et al. |
| 2020/0246133 A1 | 8/2020 | Shiuey |
| 2020/0246134 A1 | 8/2020 | Hajela et al. |
| 2020/0306031 A1 | 10/2020 | Salahieh et al. |
| 2020/0337897 A1 | 10/2020 | Sacherman et al. |
| 2020/0397566 A1 | 12/2020 | Salahieh et al. |
| 2021/0030529 A1 | 2/2021 | Adams et al. |
| 2021/0322212 A1 | 10/2021 | Adams et al. |
| 2021/0378815 A9 | 12/2021 | Salahieh et al. |
| 2021/0393397 A1* | 12/2021 | Ostermeier ............ G16H 40/63 |
| 2022/0160496 A1 | 5/2022 | Argento et al. |
| 2022/0192818 A1 | 6/2022 | Raquet et al. |
| 2022/0273423 A1 | 9/2022 | Argento et al. |
| 2022/0296362 A1 | 9/2022 | Salahieh et al. |
| 2022/0338975 A1 | 10/2022 | Brady et al. |
| 2022/0387170 A1 | 12/2022 | Waterhouse et al. |
| 2022/0401213 A1 | 12/2022 | Argento et al. |
| 2023/0063391 A1 | 3/2023 | Scholl et al. |
| 2023/0191730 A1 | 6/2023 | Walz et al. |
| 2023/0200976 A1 | 6/2023 | Salahieh et al. |
| 2023/0218387 A1 | 7/2023 | Argento et al. |
| 2023/0263620 A1 | 8/2023 | Salahieh et al. |
| 2024/0115373 A1* | 4/2024 | Dudee ................... A61F 2/1632 |
| 2024/0197468 A1 | 6/2024 | Perea et al. |
| 2024/0316318 A1* | 9/2024 | Shaolian ........... A61M 25/0136 |
| 2024/0407913 A1 | 12/2024 | Perea et al. |
| 2024/0415633 A1 | 12/2024 | Argento et al. |

(56) References Cited

U.S. PATENT DOCUMENTS

| | | |
|---|---|---|
| 2025/0064578 A1 | 2/2025 | Argento et al. |
| 2025/0099239 A1* | 3/2025 | Dvorsky ............... A61F 2/2418 |

FOREIGN PATENT DOCUMENTS

| | | |
|---|---|---|
| AU | 2010203427 | 5/2017 |
| AU | 2012335677 | 6/2017 |
| AU | 2015258287 | 12/2017 |
| CA | 2615825 | 1/2007 |
| CA | 2973684 | 7/2016 |
| CA | 2974639 | 8/2016 |
| CA | 2987311 | 12/2016 |
| CA | 2752046 | 4/2017 |
| CA | 2829143 | 4/2017 |
| CN | 1285722 | 2/2001 |
| CN | 1795090 | 6/2006 |
| CN | 101351169 | 6/2007 |
| CN | 101031257 | 9/2007 |
| CN | 101641060 | 11/2007 |
| CN | 101277659 | 10/2008 |
| CN | 101360468 | 2/2009 |
| CN | 101547663 | 9/2009 |
| CN | 101069106 | 2/2010 |
| CN | 102271623 | 7/2010 |
| CN | 103946251 | 7/2014 |
| CN | 104725553 | 6/2015 |
| CN | 108472129 | 8/2018 |
| CN | 107205815 | 8/2020 |
| EP | 0604369 A1 | 6/1994 |
| EP | 0734269 A1 | 10/1996 |
| EP | 0784652 A1 | 7/1997 |
| EP | 0800511 A1 | 10/1997 |
| EP | 0820601 A1 | 1/1998 |
| EP | 0826158 A1 | 3/1998 |
| EP | 0898972 A2 | 3/1999 |
| EP | 0907668 A1 | 4/1999 |
| EP | 0930357 A1 | 7/1999 |
| EP | 0604369 B1 | 8/1999 |
| EP | 0826158 B1 | 9/1999 |
| EP | 0947856 A2 | 10/1999 |
| EP | 0820601 B1 | 12/1999 |
| EP | 0800511 B1 | 1/2000 |
| EP | 0989138 A2 | 3/2000 |
| EP | 1084428 A1 | 3/2001 |
| EP | 1088246 A1 | 4/2001 |
| EP | 1090313 A1 | 4/2001 |
| EP | 1095711 A2 | 5/2001 |
| EP | 1095965 A1 | 5/2001 |
| EP | 1095966 A2 | 5/2001 |
| EP | 1109853 A1 | 6/2001 |
| EP | 0907668 B1 | 9/2001 |
| EP | 1141054 A1 | 10/2001 |
| EP | 1187873 A1 | 3/2002 |
| EP | 1200019 A1 | 5/2002 |
| EP | 1227773 A1 | 8/2002 |
| EP | 1230041 A2 | 8/2002 |
| EP | 1266246 A1 | 12/2002 |
| EP | 0898972 B1 | 4/2003 |
| EP | 1341485 A1 | 9/2003 |
| EP | 1364663 A1 | 11/2003 |
| EP | 1095711 B1 | 1/2004 |
| EP | 1141054 B1 | 2/2004 |
| EP | 1395302 A1 | 3/2004 |
| EP | 1410074 A1 | 4/2004 |
| EP | 1266246 B1 | 6/2004 |
| EP | 1109853 B1 | 9/2004 |
| EP | 1187873 B1 | 9/2004 |
| EP | 1084428 B2 | 11/2004 |
| EP | 1472305 A1 | 11/2004 |
| EP | 1230041 B1 | 12/2004 |
| EP | 0989138 B1 | 2/2005 |
| EP | 1095965 B1 | 2/2005 |
| EP | 1395302 B1 | 2/2005 |
| EP | 1507811 A1 | 2/2005 |
| EP | 1524953 A2 | 4/2005 |
| EP | 1200019 B1 | 9/2005 |
| EP | 1095966 B1 | 1/2006 |
| EP | 1660153 A2 | 5/2006 |
| EP | 1353611 B1 | 9/2006 |
| EP | 1696975 A1 | 9/2006 |
| EP | 1341485 B1 | 11/2006 |
| EP | 1723933 A2 | 11/2006 |
| EP | 1723934 A2 | 11/2006 |
| EP | 1750157 A1 | 2/2007 |
| EP | 1088246 B1 | 11/2007 |
| EP | 1857477 A1 | 11/2007 |
| EP | 1227773 B1 | 1/2008 |
| EP | 1888660 A2 | 2/2008 |
| EP | 1890650 A2 | 2/2008 |
| EP | 1902737 A1 | 3/2008 |
| EP | 1723933 B1 | 11/2008 |
| EP | 2035050 A2 | 3/2009 |
| EP | 2035480 A1 | 3/2009 |
| EP | 2035486 A1 | 3/2009 |
| EP | 1723934 B1 | 6/2009 |
| EP | 2066732 A2 | 6/2009 |
| EP | 2077292 A1 | 7/2009 |
| EP | 2092376 A1 | 8/2009 |
| EP | 1648534 B1 | 9/2009 |
| EP | 2094193 A2 | 9/2009 |
| EP | 2109784 A1 | 10/2009 |
| EP | 2120789 A2 | 11/2009 |
| EP | 2126614 A2 | 12/2009 |
| EP | 2035480 B1 | 2/2010 |
| EP | 2170708 A2 | 4/2010 |
| EP | 2178463 | 4/2010 |
| EP | 2185589 A2 | 5/2010 |
| EP | 2231207 A1 | 9/2010 |
| EP | 1750157 B1 | 10/2010 |
| EP | 2235094 A1 | 10/2010 |
| EP | 2276513 A2 | 1/2011 |
| EP | 2292672 A2 | 3/2011 |
| EP | 2356170 A1 | 8/2011 |
| EP | 2356497 A2 | 8/2011 |
| EP | 2109784 B1 | 10/2011 |
| EP | 2396355 A2 | 12/2011 |
| EP | 2035486 B1 | 4/2012 |
| EP | 2452212 A2 | 5/2012 |
| EP | 1857477 B1 | 6/2012 |
| EP | 1410074 B1 | 10/2012 |
| EP | 2092376 B1 | 10/2012 |
| EP | 2510051 A1 | 10/2012 |
| EP | 2513711 A1 | 10/2012 |
| EP | 2514791 A1 | 10/2012 |
| EP | 2356170 B1 | 12/2012 |
| EP | 2538266 A1 | 12/2012 |
| EP | 2563275 A1 | 3/2013 |
| EP | 2597113 A1 | 5/2013 |
| EP | 2598936 A1 | 6/2013 |
| EP | 2077292 B1 | 8/2013 |
| EP | 2625216 A1 | 8/2013 |
| EP | 2625217 A1 | 8/2013 |
| EP | 2625218 A1 | 8/2013 |
| EP | 2652532 A1 | 10/2013 |
| EP | 1830898 B1 | 3/2014 |
| EP | 2766750 A1 | 8/2014 |
| EP | 2452212 B1 | 3/2015 |
| EP | 2934383 A1 | 10/2015 |
| EP | 2200536 B1 | 1/2016 |
| EP | 2976042 A1 | 1/2016 |
| EP | 2979662 | 2/2016 |
| EP | 3185818 | 3/2016 |
| EP | 2129331 B1 | 4/2016 |
| EP | 3003217 A1 | 4/2016 |
| EP | 3025678 A1 | 6/2016 |
| EP | 2259750 B1 | 7/2016 |
| EP | 2934383 A4 | 7/2016 |
| EP | 3042634 | 7/2016 |
| EP | 3062741 A1 | 9/2016 |
| EP | 3072476 A1 | 9/2016 |
| EP | 1999188 B1 | 11/2016 |
| EP | 2685935 B1 | 11/2016 |
| EP | 2094193 | 1/2017 |
| EP | 2683287 | 2/2017 |

(56) References Cited

FOREIGN PATENT DOCUMENTS

| | | |
|---|---|---|
| EP | 3062742 | 2/2017 |
| EP | 3157466 | 4/2017 |
| EP | 3160404 | 5/2017 |
| EP | 3160683 | 5/2017 |
| EP | 3049023 | 6/2017 |
| EP | 3174500 | 6/2017 |
| EP | 3181094 | 6/2017 |
| EP | 2539351 | 7/2017 |
| ES | 2283058 T3 | 10/2007 |
| FR | 2653325 A1 | 4/1991 |
| JP | 59-501897 | 11/1984 |
| JP | 01-223970 | 9/1989 |
| JP | 2002372688 | 12/2002 |
| JP | 2004502510 | 1/2004 |
| JP | 2006506196 | 6/2004 |
| JP | 2006518222 | 7/2004 |
| JP | 2007-506516 | 3/2007 |
| JP | 2007-517616 | 7/2007 |
| JP | 2006516002 | 7/2008 |
| JP | 2010514507 | 7/2008 |
| JP | 2010-517639 | 5/2010 |
| JP | 2012-532685 | 12/2012 |
| JP | 2016-534816 | 11/2016 |
| JP | 2017-522120 | 8/2017 |
| JP | 2019-516515 | 6/2019 |
| JP | 2020-503110 | 1/2020 |
| WO | 9007545 A2 | 7/1990 |
| WO | 9007575 A1 | 7/1990 |
| WO | 9516475 A1 | 6/1995 |
| WO | 9611235 A1 | 4/1996 |
| WO | 9620919 A1 | 7/1996 |
| WO | 9631791 A1 | 10/1996 |
| WO | 9636890 A1 | 11/1996 |
| WO | 9749740 A1 | 12/1997 |
| WO | 9917684 A1 | 4/1999 |
| WO | 9929818 A1 | 6/1999 |
| WO | 9957581 A1 | 11/1999 |
| WO | 9960428 A1 | 11/1999 |
| WO | WO1999059668 | 11/1999 |
| WO | 9963366 A1 | 12/1999 |
| WO | 2000004078 A1 | 1/2000 |
| WO | 2000026980 A1 | 6/2000 |
| WO | 2000071613 A1 | 11/2000 |
| WO | 2001008607 A1 | 2/2001 |
| WO | 2001030512 A2 | 5/2001 |
| WO | 2001034067 A1 | 5/2001 |
| WO | 2001071392 A1 | 9/2001 |
| WO | 2002047583 A1 | 6/2002 |
| WO | WO2002074202 | 9/2002 |
| WO | 2002094331 A1 | 11/2002 |
| WO | 2003009014 A1 | 1/2003 |
| WO | 2003066707 A1 | 8/2003 |
| WO | 2003097711 A1 | 11/2003 |
| WO | 2004010905 A2 | 2/2004 |
| WO | 2004046768 A2 | 6/2004 |
| WO | 2004052242 A1 | 6/2004 |
| WO | 2004053536 A2 | 6/2004 |
| WO | 2004054471 A2 | 7/2004 |
| WO | 2004058318 A1 | 7/2004 |
| WO | 2004072689 A2 | 8/2004 |
| WO | 2005023331 A2 | 3/2005 |
| WO | 2005065734 A1 | 7/2005 |
| WO | 2006047383 A2 | 5/2006 |
| WO | WO2006070628 | 7/2006 |
| WO | 2006103674 A2 | 10/2006 |
| WO | 2006126095 A2 | 11/2006 |
| WO | 2007005778 A2 | 1/2007 |
| WO | WO2007005692 | 1/2007 |
| WO | 2007047529 A2 | 4/2007 |
| WO | 2007047530 A2 | 4/2007 |
| WO | 2007050394 A2 | 5/2007 |
| WO | 2007064594 A2 | 6/2007 |
| WO | 2008005644 A1 | 1/2008 |
| WO | 2008005652 A1 | 1/2008 |
| WO | 2008005752 A2 | 1/2008 |
| WO | 2008024766 A2 | 2/2008 |
| WO | 2008039655 A2 | 4/2008 |
| WO | 2008076729 A1 | 6/2008 |
| WO | 2008077040 A2 | 6/2008 |
| WO | 2008082957 A2 | 7/2008 |
| WO | 2008094876 A1 | 8/2008 |
| WO | 2008103798 A2 | 8/2008 |
| WO | 2008107882 A2 | 9/2008 |
| WO | 2008116132 A2 | 9/2008 |
| WO | 2008151088 A2 | 12/2008 |
| WO | 2009002703 A2 | 12/2008 |
| WO | 2009002789 | 12/2008 |
| WO | 2009015161 A2 | 1/2009 |
| WO | 2009015226 A2 | 1/2009 |
| WO | 2009015234 A2 | 1/2009 |
| WO | 2009015240 A2 | 1/2009 |
| WO | 2009085755 A1 | 7/2009 |
| WO | 2009085756 A1 | 7/2009 |
| WO | 2009127844 A2 | 10/2009 |
| WO | 2010056686 A1 | 5/2010 |
| WO | 2010056687 A2 | 5/2010 |
| WO | 2010081093 A2 | 7/2010 |
| WO | 2010093823 A2 | 8/2010 |
| WO | 2011005937 A2 | 1/2011 |
| WO | 2011026068 A2 | 3/2011 |
| WO | 2011071790 A1 | 6/2011 |
| WO | 2011075377 A1 | 6/2011 |
| WO | 2011106435 A2 | 9/2011 |
| WO | 2012006616 A2 | 1/2012 |
| WO | 2012015639 A1 | 2/2012 |
| WO | 2012047961 A1 | 4/2012 |
| WO | 2012047964 A1 | 4/2012 |
| WO | 2012047969 A1 | 4/2012 |
| WO | 2012082704 A1 | 6/2012 |
| WO | 2012129407 A2 | 9/2012 |
| WO | 2012129419 | 9/2012 |
| WO | 2013055746 A1 | 4/2013 |
| WO | 2013059195 | 4/2013 |
| WO | 2013070924 A1 | 5/2013 |
| WO | 2013158942 A1 | 10/2013 |
| WO | 2013166068 A1 | 11/2013 |
| WO | 2014093751 A2 | 6/2014 |
| WO | 2014093764 A1 | 6/2014 |
| WO | 2014095690 A1 | 6/2014 |
| WO | 2014099630 A1 | 6/2014 |
| WO | 2014143926 A1 | 9/2014 |
| WO | 2014149462 A1 | 9/2014 |
| WO | 2014152017 A1 | 9/2014 |
| WO | WO2014134302 | 9/2014 |
| WO | WO2014152017 | 9/2014 |
| WO | 2015038620 A2 | 3/2015 |
| WO | 2015048279 A1 | 4/2015 |
| WO | 2015066502 A1 | 5/2015 |
| WO | 2015066532 | 5/2015 |
| WO | WO2015066502 | 5/2015 |
| WO | WO2015073060 | 5/2015 |
| WO | 2015148673 A1 | 10/2015 |
| WO | 2016018932 A1 | 2/2016 |
| WO | WO2016018932 | 2/2016 |
| WO | 2016033217 A1 | 3/2016 |
| WO | 2016038470 A2 | 3/2016 |
| WO | 2016061233 A1 | 4/2016 |
| WO | 2016122805 A1 | 8/2016 |
| WO | 2016133558 | 8/2016 |
| WO | 2016140708 A1 | 9/2016 |
| WO | 2016195095 A1 | 12/2016 |
| WO | 2016201351 A1 | 12/2016 |
| WO | 2017079449 | 5/2017 |
| WO | 2017079733 | 5/2017 |
| WO | 2017087358 | 5/2017 |
| WO | WO2017084551 | 5/2017 |
| WO | WO2017203517 | 11/2017 |
| WO | 2017208230 | 12/2017 |
| WO | 2017221196 | 12/2017 |
| WO | 2017223544 | 12/2017 |
| WO | 2016119408 | 6/2018 |
| WO | WO2018119408 | 6/2018 |
| WO | 2018222579 | 12/2018 |
| WO | 2018227014 | 12/2018 |

(56) References Cited

FOREIGN PATENT DOCUMENTS

| WO | WO2019050690 | 3/2019 |
| WO | 2020219456 | 10/2020 |
| WO | 2021007535 | 1/2021 |
| WO | WO2021158882 | 8/2021 |
| WO | WO2022220861 | 10/2022 |
| WO | WO2022226269 | 10/2022 |
| WO | WO2023081417 | 5/2023 |
| WO | WO2023192202 | 10/2023 |
| WO | WO2024159158 | 8/2024 |
| WO | WO2024182525 | 9/2024 |
| WO | WO2025034817 | 2/2025 |
| WO | WO2025059578 | 3/2025 |
| WO | WO2025080591 | 4/2025 |
| WO | WO2025101660 | 5/2025 |

OTHER PUBLICATIONS

European Extended Search Report mailed Jul. 6, 2023 for European Patent Application No. 20837776.2, Applicant: Shifamed Holdings, LLC, 7 pages.

International Search Report and Written Opinion for PCT Application No. PCT/US2022/025887, filed Apr. 22, 2022, Applicant: Shifamed Holdings, LLC, Date of Mailing: Aug. 11, 2022, 9 pages.

International Search Report and Written Opinion for PCT Application No. PCT/US2022/049046, filed Nov. 4, 2022, Applicant: Shifamed Holdings, LLC, Date of Mailing: Mar. 24, 2023, 13 pages.

Klank, et al. CO2-laser micromachining and back-end processing for rapid production of PMMA-based microfluidic systems. Lab Chip, 2002, 2, 242-246.

Tsao, et al. Bonding of thermoplastic polymer microfluidics. Microfluid Nanofuild (2009) 6:1-16.

Umbrecht, et al. "Solvent assisted bonding of polymethylmethacrylate: characterization using the response surface methodology," Jan. 2008, pp. 1325-1328.

Liang et al., "Bionic intraocular lens with variable focus and integrated structure," Optical Engineering 2015, vol. 54, No. 10, Article No. 105106, Internal pp. 1-7.

International Search Report and Written Opinion for PCT Application No. PCT/US2020/041644, filed Jul. 10, 2020, Applicant: Shifamed Holdings, LLC, Date of Mailing: Oct. 27, 2020, 11 pages.

International Search Report and Written Opinion for PCT Application No. PCT/US2024/041228, Applicant: Shifamed Holdings, LLC, Date of Mailing: Oct. 30, 2024, 18 pages.

International Search Report and Written Opinion for PCT Application No. PCT/US2024/050389, Applicant: Shifamed Holdings, LLC, Date of Mailing: Jan. 24, 2025, 16 pages.

International Search Report and Written Opinion for PCT Application No. PCT/US2024/013205, Applicant: Shifamed Holdings, LLC, Date of Mailing: Jan. 30, 2025, 10 pages.

Kent, "Accommodating IOLs: Two More Possibilities," Review of Ophthalmology, on-line article, Retrieved from <URL: https://www.reviewofophthalmology.com/article/accommodating-iols-two-more-possibilities> on Apr. 15, 2024, 3 pages.

Werner, "Accommodating IOLs: Where Are We Now, and What's on the Horizon? An overview of five lenses currently under investigation," CRST Cataract & Refractive Surgery Today, Retrieved from <URL: https://crstoday.com/articles/feb-2022/accommodating-iols-where-are-we-now-and-whats-on the-horizon>, Feb. 28, 2022, 13 pages.

International Search Report and Written Opinion for PCT Application No. PCT/US2024/054795, Applicant: Shifamed Holdings, LLC, Date of Mailing: Feb. 27, 2025, 15 pages.

International Search Report and Written Opinion for PCT Application No. PCT/US2024/061348, Applicant: Shifamed Holdings, LLC, Date of Mailing: Feb. 28, 2024, 10 pages.

* cited by examiner

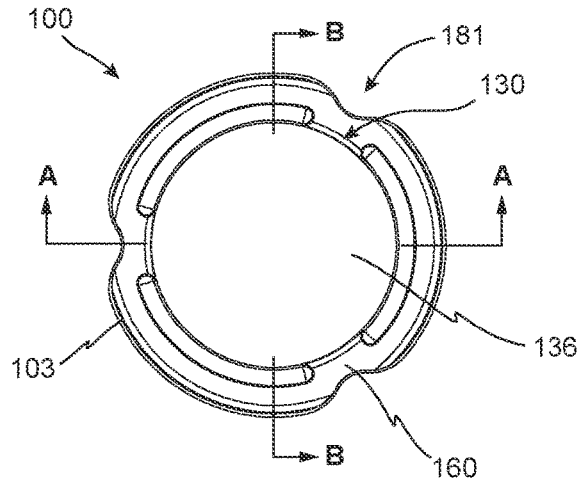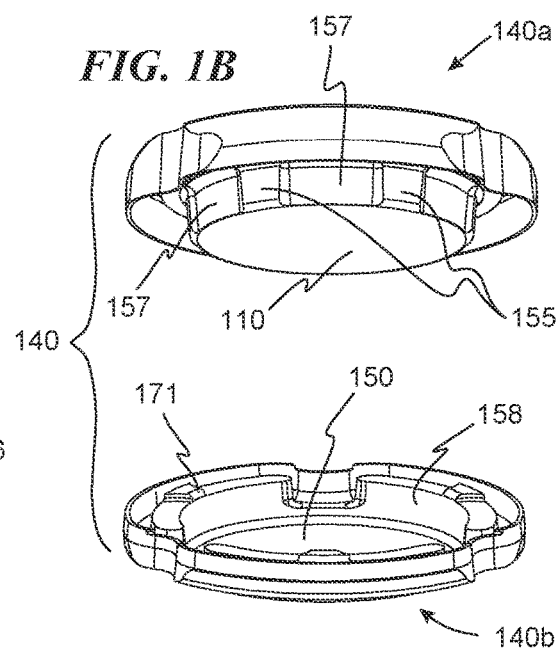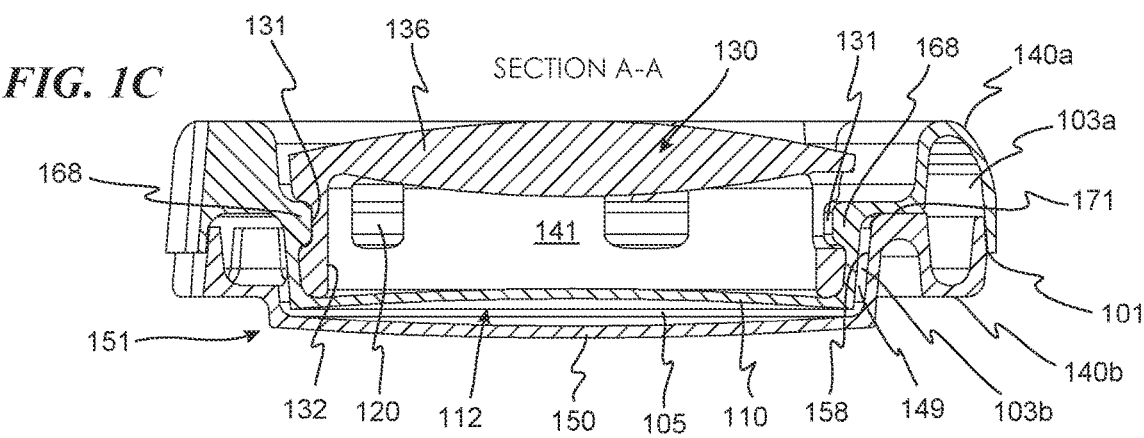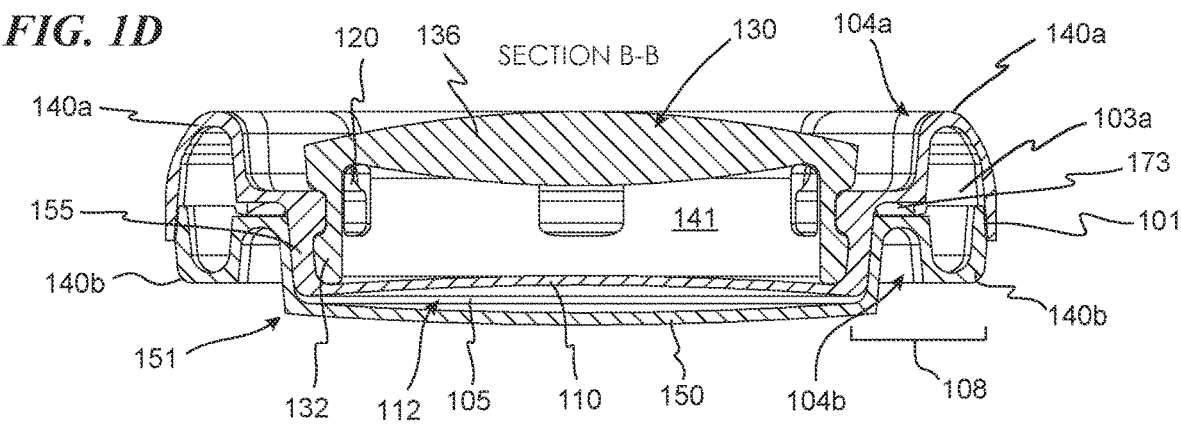

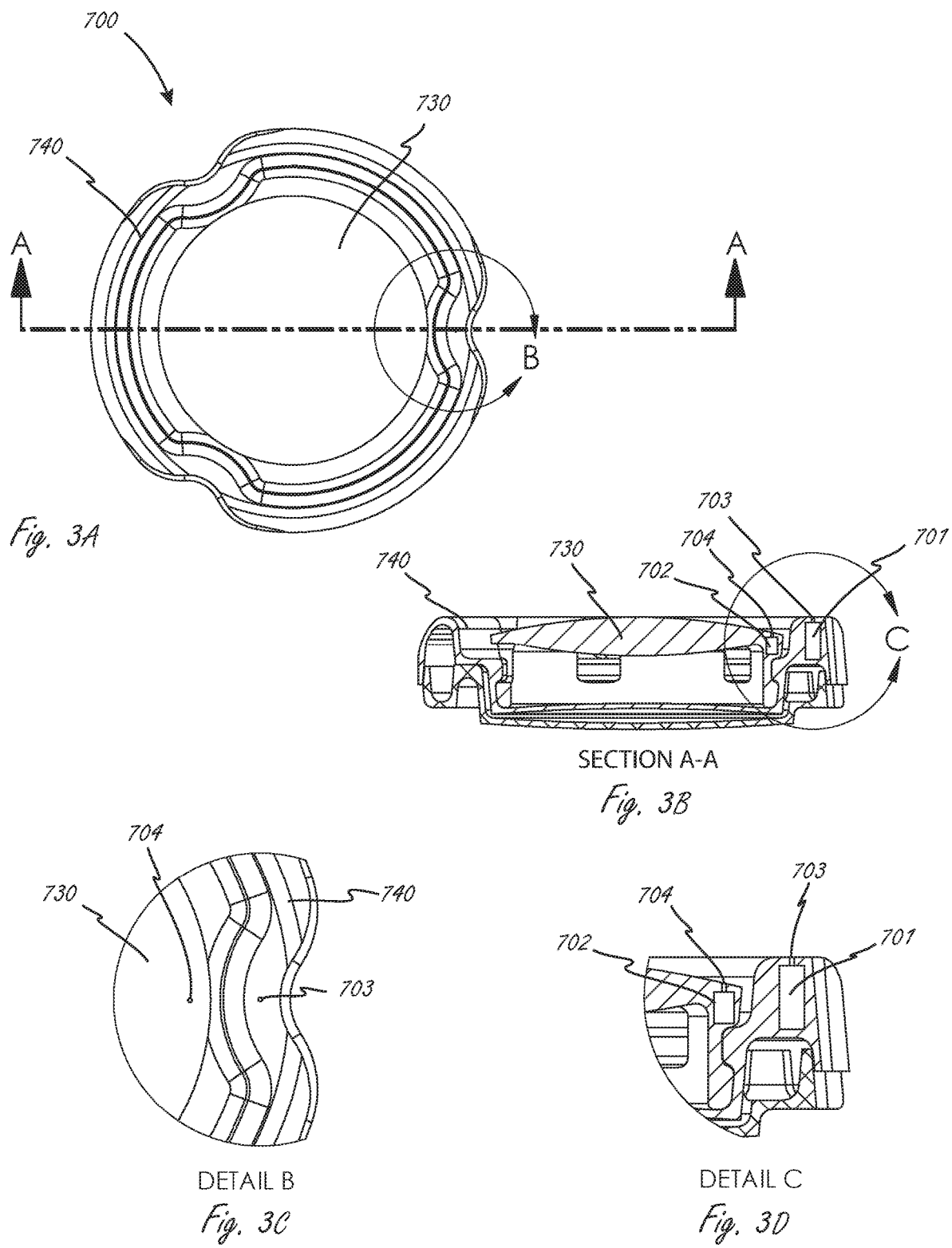

ACCOMMODATING INTRAOCULAR LENSES AND ASSOCIATED METHODS

CROSS-REFERENCE TO RELATED APPLICATION(S)

This application is a 35 U.S.C. § 371 U.S. National Phase application of International Patent Application No. PCT/US2020/041644, filed Jul. 10, 2020, and titled ACCOMMODATING INTRAOCULAR LENSES AND ASSOCIATED METHODS, which claims priority to U.S. Provisional Patent Application No. 62/873,092, titled ACCOMMODATING INTRAOCULAR LENSES AND ASSOCIATED METHODS, filed Jul. 11, 2019, and U.S. Provisional Patent Application No. 62/976,863, titled ACCOMMODATING INTRAOCULAR LENSES AND ASSOCIATED METHODS, filed Feb. 14, 2020, the disclosures of which are incorporated herein by reference in their entireties.

TECHNICAL FIELD

The present technology relates to accommodating intraocular lenses (AIOLs) and methods of implanting and assembling the same.

BACKGROUND

Cataracts can affect a large percentage of the worldwide adult population with clouding of the native crystalline lens and, in some cases, vision loss. Patients with cataracts can be treated by native lens removal and surgical implantation of a synthetic intraocular lens (IOL). In the United States, there are 3.5 million cataract procedures performed annually, while worldwide over 20 million procedures are performed annually.

Although IOL implantation procedures can be effective at restoring vision, conventional IOLs have several drawbacks. For example, many conventional IOLs are not able to change focus as a natural lens would (known as accommodation). Other drawbacks of conventional IOLs include refractive errors that occur after implantation and may require glasses for correcting distance vision. Additionally, in other cases conventional IOLs can be effective in providing far vision but patients need glasses for intermediate and near vision.

BRIEF DESCRIPTION OF THE DRAWINGS

Many aspects of the present technology can be better understood with reference to the following drawings. The components in the drawings are not necessarily drawn to scale. Instead, emphasis is placed on illustrating clearly the principles of the present technology. Furthermore, components can be shown as transparent in certain views for clarity of illustration only and not to indicate that the component is necessarily transparent. Components may also be shown schematically.

FIG. 1A illustrates a posterior-anterior elevation view of an AIOL configured in accordance with an embodiment of the present technology.

FIG. 1B illustrates the accommodating structure of the AIOL of FIG. 1A in an exploded configuration.

FIG. 1C illustrates a cross-sectional view of the AIOL of FIG. 1A taken along the cut-plane A-A of FIG. 1A.

FIG. 1D illustrates a cross-sectional view of the AIOL of FIG. 1A taken along the cut-plane B-B of FIG. 1A.

FIG. 3A illustrates an anterior-posterior elevation view of an AIOL having a drug reservoir and configured in accordance with another embodiment of the present technology.

FIG. 3B illustrates a close-up view of a port of the drug reservoir of the AIOL of FIG. 3A.

FIG. 3C illustrates a cross-sectional view of the AIOL of FIG. 3A taken along the cut-plane A-A of FIG. 3A.

FIG. 3D illustrates a close-up cross-sectional view of the drug reservoir of the AIOL of FIG. 3A.

DETAILED DESCRIPTION

Figure 2A:
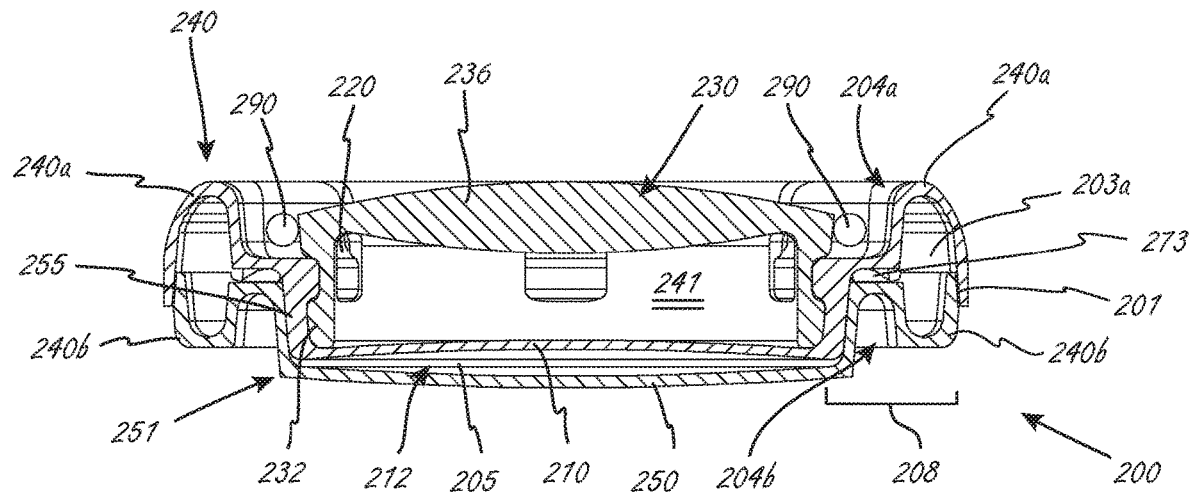
FIG. 2A illustrates a cross-sectional view of an AIOL having a pressure sensor connected to the fixed lens structure and configured in accordance with another embodiment of the present technology.

The present technology is directed to AIOLs and methods for making and using such devices. In many of the embodiments disclosed herein, the AIOLs include an accommodating lens portion and a fixed lens portion configured to removably connect to the accommodating lens portion. Additionally, in certain embodiments, AIOLs may include one or more pressure sensors. The pressure sensor(s) can be configured to monitor intraocular pressure (IOP) when implanted in a patient's eye. In some of the embodiments disclosed herein, the AIOLs include drug-eluting structures configured to release drugs into the patient's eye when implanted.

Specific details of various embodiments of the present technology are described below with reference to FIGS. 1A-3D. Although many of the embodiments are described below with respect to AIOLs and associated methods, other embodiments are within the scope of the present technology. Additionally, other embodiments of the present technology can have different configurations, components, and/or procedures than those described herein. For instance, AIOLs configured in accordance with the present technology may include additional elements and features beyond those described herein, or other embodiments may not include several of the elements and features shown and described herein.

For ease of reference, throughout this disclosure identical reference numbers are used to identify similar or analogous components or features, but the use of the same reference number does not imply that the parts should be construed to be identical. Indeed, in many examples described herein, the identically numbered parts are distinct in structure and/or function.

FIGS. 1A-1D illustrate an AIOL 100 configured in accordance with an embodiment of the present technology. The AIOL 100 includes channels for fluid to flow between an outer fluid reservoir to an inner fluid chamber. Referring to FIGS. 1A and 1B together, the AIOL 100 includes an accommodating structure 140 having a first component 140a (e.g., an anterior component) and a second component 140b (e.g., a posterior component). In some embodiments, the first and second components 140a and 140b are assembled to form an outer fluid reservoir 103 (FIG. 1A), a mid-bellows channel 183 (FIG. 1E), and an inner fluid chamber 105 (FIGS. 1C-1D). The first component 140a of the accommodating structure 140 can have an inner portion with a first optical component 110, standoffs 155, and recesses 157 between the standoffs 155. The standoffs 155 project radially outward from the recesses 157. The second component 140b of the accommodating structure 140 can have an inner portion with a second optical component 150 and a wall 158 (e.g., an inner wall). Referring to FIGS. 1C and 1D, which are cross-sectional views taken along lines A-A and B-B of FIG. 1A, respectively, the standoffs 155 contact the wall 158 (FIG. 1D) such that the recesses 157 (FIG. 1B) define channels or openings for fluid to flow from the mid-bellows channel 183 (e.g., from the outer fluid reservoir 103) to the fluid chamber 105.

As best seen in FIG. 1D, the standoffs 155 project radially outward to engage the wall 158. The standoffs 155 of the AIOL 100 accordingly do not extend into the optical region of the AIOL, which increases the field of view of the AIOL 100.

In some embodiments, the AIOL 100 includes flow-through features 181 that enhance the rate and ease with which Ophthalmic Viscosurgical Devices (OVDs) used during the implantation of AIOLs can be removed from the natural lens capsule. As best seen in FIG. 1A, for example, the AIOL 100 comprises three outer flow-through features 181. The outer flow-through features 181 can be detents, such as recesses, distributed circumferentially along the perimeter of the outer fluid reservoir 103. In the illustrated embodiment, the flow-through features 181 are formed in regions of the first and second components 140a and 140b. Although three outer flow-through features 181 are illustrated, other embodiments may comprise fewer or more flow-through features than illustrated. The outer flow-through features 181 may additionally provide rotational constraint to maintain the rotational orientation of the accommodating structure 140 with respect to a patient's eye capsule when implanted.

The AIOL 100 additionally comprises a fixed lens assembly 130. The fixed lens assembly 130 illustrated in FIGS. 1C-D includes an optical portion 136, a skirt 132 extending from the optical portion 136, and passages 120. The optical portion 136 can have a fixed power which may comprise an asymmetrically powered lens (e.g., a toric lens) or other lens, and the passages 120 are holes, slots, orifices, etc., that pass through the skirt 132 and extend into a perimeter region but not the optical portion 136.

Referring to FIG. 1C, the fixed lens assembly 130 can have an engagement feature 131, such as an annular groove, that extends around the skirt 132, and the first component 140a of the accommodating structure 140 can have a thickened region 168, such as an annular protrusion (e.g., a ledge) that extends radially inwardly. The fixed lens assembly 130 can be attached to the accommodating structure 140 by engaging the continuous thickened region 168 of the first component 140a with the engagement feature 131 of the fixed lens 130. In other embodiments (not shown), the thickened region 168 and the engagement feature 131 may be discontinuous features (e.g., segmented or other recesses or protrusions that extend around less than the full circumference of the fixed lens assembly 130 and the accommodating structure 140). Such a discontinuous thickened region 168 and engagement feature 131 can facilitate maintenance of a particular radial alignment between the fixed lens assembly 130 and the accommodating structure 140, such as when the fixed lens 130 comprises a toric lens or other asymmetrical lens. Alternatively, the groove may be in the fixed lens 130 and the protrusion on the accommodating structure 140.

The AIOL 100 can have a fluid accommodating lens 112 defined by the fluid chamber 105 (FIGS. 1C and 1D) bounded between the first optical component 110 and the second optical component 150. The fluid chamber 105 is in fluid communication with the outer reservoir 103 via discrete fluid channels 149 between standoffs 155 when the first and second components 140a and 140b of the accommodating structure 140 are assembled. The first and second optical components 110 and 150 may be planar members (e.g., optical membranes) of the first and second components 140a and 140b, respectively. The first and second optical components 110 and 150, for example, can be integrally formed as optical membranes with the other portions of the first and second components 140a and 140b. In alternate embodiments, either or both of the membranes of the first and second optical components 110 and 150 may be a lens (i.e., have an optical power).

The AIOL 100 can further include a square-shaped (e.g., stepped) annular region 151 that inhibits cell migration from the periphery of the patient's capsule to the optical part of AIOL 100 (shown in FIGS. 1C-D at the posterior most region of the lens). Inhibiting cell migration from the periphery of the patient's capsule to the optical part of the AIOL 100 can reduce the risk of post-surgery opacification of the optical system.

The peripheral portions of the first component 140a and the second component 140b can define the outer fluid reservoir 103, and the inner portions of the first and second components 140a and 140b can define the accommodating structure 140. In some embodiments, the outer fluid reservoir 103 is formed in only one of the first component 140a or the second component 140b. The first and second components 140a and 140b can be bonded together at a seam 101. Means of bonding are described in detail in International (PCT) Pub. No. WO2018/119408, which is incorporated herein by reference in its entirety. The first and second components 140a and 140b can also be bonded at other areas, such as at the standoffs 155. The standoffs 155 are separated by spaces that define fluid channels between the outer fluid reservoir 103 and the inner fluid chamber 105. In some embodiments, the entire accommodating structure 140 is manufactured as a single piece. The outer fluid reservoir 103 can be a bellows 108 having an outer bellows region 103a and an inner bellows region 103b, and the inner bellows region 103b can be defined by the channels between the standoffs 155. In some embodiments, the outer fluid reservoir 103 is formed as a single piece that is connected (e.g., bonded to) to the inner fluid chamber 105 during manufacture. In some embodiments, the outer fluid reservoir 103 is a generally toroidal structure with a constant or substantially constant cross-sectional shape as observed along cut planes parallel to and coincident with the optical axis of the accommodating structure 140. In some embodiments, the outer fluid reservoir 103 is separated by solid walls into two or more reservoir portions along the circumference of the outer fluid reservoir 103.

In some embodiments, the volume of the inner bellows region 103b is less than the outer bellows region 103a. By reducing the volume of the inner bellows region 103b, additional space surrounding the optical region of the AIOL allows the optical aperture of the fixed lens 130 to be larger compared to embodiments with larger inner bellows regions. Additionally, the passages 120 of the fixed lens 130, which allow aqueous fluid to freely flow in and out of the chamber 141, are configured to pass through the outer skirt 132 and, in some embodiments, not the top optical portion 136. This is expected to reduce unwanted scattered light from internal reflections which may pass through the optical system and reach the retina.

As best seen in FIG. 1A, the first component 140a may also comprise one or more thickened regions 160 for use, for instance, in filling the AIOL with an optical fluid. The thickened region(s) 160 allow for a longer path for a needle used to fill the accommodating structure with optical fluid while a second needle in a different region is used to remove the gases the fluid is replacing. In some embodiments, the optical fluid may be comprised of a high refractive index poly vinyl alcohol. As illustrated, the thickened region(s) 160 are located adjacent one or more of the outer fluid flow-throughs 181. In other embodiments, however, the thickened region(s) 160 may have other arrangements/configurations.

Referring to FIG. 1D, the outer fluid reservoir 103 of the AIOL 100 can comprise (a) a first bellows structure 103a with an anterior portion 104a and a posterior portion 104b, (b) a second bellows structure 103b radially inward of the first bellows structure 104a, and/or (c) the mid-bellows channel structure 183 (FIG. 1E) defining a horizontal passageway between the first and second bellows structures 103a and 103b. During operation as the capsule contracts, a mid-portion of the first bellows structure 103a can be constrained by the mid-bellows channel 183 while the anterior and posterior portions 104a and 104b of the first bellows structure 103a move radially inward with respect to the mid-bellows channel 183. The anterior and posterior portions 104a and 104b of the first bellows structure 103a can accordingly flex radially inward in response to the same amount of movement of the native capsule. This can cause more fluid to flow from the outer fluid reservoir 103 to the inner fluid chamber 105 and thereby provides more accommodation because anterior-posterior collapse of the outer fluid reservoir 103 is less efficient than radial compression of the outer fluid reservoir 103. Embodiments such as, but not limited to any of those illustrated herein may be constructed from parts in which some or all of the portions not in the optical path have been dyed or treated to reduce light throughout to limit the ability of stray light entering portions outside the optical path from scattering into the optical path.

In operation, the outer fluid reservoir 103 can be configured to transfer fluid to the inner fluid chamber 105 in response to compressive forces on the first bellows structure 103a from the capsule in which the AIOL 100 is implanted. This compressive force can be caused by, for example, ciliary muscles within the eye acting on the capsule. Transfer of fluid into and out from the inner fluid chamber 105 changes the shape of one or both of the first optical component 110 and the second optical component 150, thereby changing the optical power of the fluid accommodating lens 112.

The fixed lens described in any of the embodiments described herein may be of spherical, aspherical, toric, or any other known lens configuration. Alternatively, or in combination, the fixed solid lens may be plano-convex, convex-concave, or convex-convex. The fixed lens may be configured to have positive or have negative fixed power.

The fluid lenses described herein may be configured such as to have one or more accommodating surfaces (e.g., two accommodating surfaces).

As noted previously, instead of membranes without a power, in some embodiments the accommodating structure can include one or more deformable lenses that deflect based upon fluid pressure within the inner fluid chamber. The deformable lenses can each or both have a fixed power that can be positive or negative.

Pressure Sensors

In some embodiments, it may be desirable to monitor IOP within the patient's eye after implantation of an AIOL. Monitoring IOP within the eye and providing therapeutic treatment thereof can reduce the risk of damage to the optic nerve and can reduce the risk of irreversible development of glaucoma and/or other damaging conditions.

FIG. 2A illustrates an AIOL 200 configured in accordance with another embodiment of the present technology. The AIOL 200 has many or all of the same features of AIOL 100 described above with respect to FIGS. 1A-1D. For example, like reference numbers between FIG. 2A and FIGS. 1A-1D indicate identical or similar features (e.g., fixed structure 230 v. fixed lens structure 130). As illustrated, the AIOL 200 comprises a pressure sensor 290. The pressure sensor 290 can be connected, for example, to the fixed lens assembly 230. In some embodiments, the pressure sensor 290 has a generally toroidal shape and/or ring shape. The pressure sensor 290 can be removable from the fixed lens assembly 230 or permanently connected thereto. In either case, the pressure sensor 290 may be removable from the eye capsule without removing the accommodating structure 240 from the patient's eye. Removability of the pressure sensor 290 from the accommodating structure is expected to facilitate replacement of a faulty or expired sensor with considerably less impact on the patient than would be required if the entire accommodating structure 240 was required to be removed.

The pressure sensor 290 can be constructed from a flexible and/or resilient material configured to expand and contract in response to increasing or decreasing pressure in the patient's eye capsule in response to a corresponding increase or decrease of the patient's TOP. The pressure sensor 290 can include electronics configured to quantify the changes in TOP using the expansion/contraction of the pressure sensor 290. In some embodiments, the pressure sensor 290 is configured to be read via an optical instrument from outside of the patient's eye. For example, an optical instrument can be used to view the volume, shape, orientation, and/or some other characteristic of the pressure sensor 290 to determine and/or estimate the TOP of the patient. When the AIOL is assembled, either before or after implantation in the eye, the pressure sensor 290 can be positioned at least partially in a space between the fixed lens assembly 230 and the bellows 208 of the accommodating structure 240, as measured perpendicular to an optical axis of the fixed lens assembly 230.

Figure 2B:
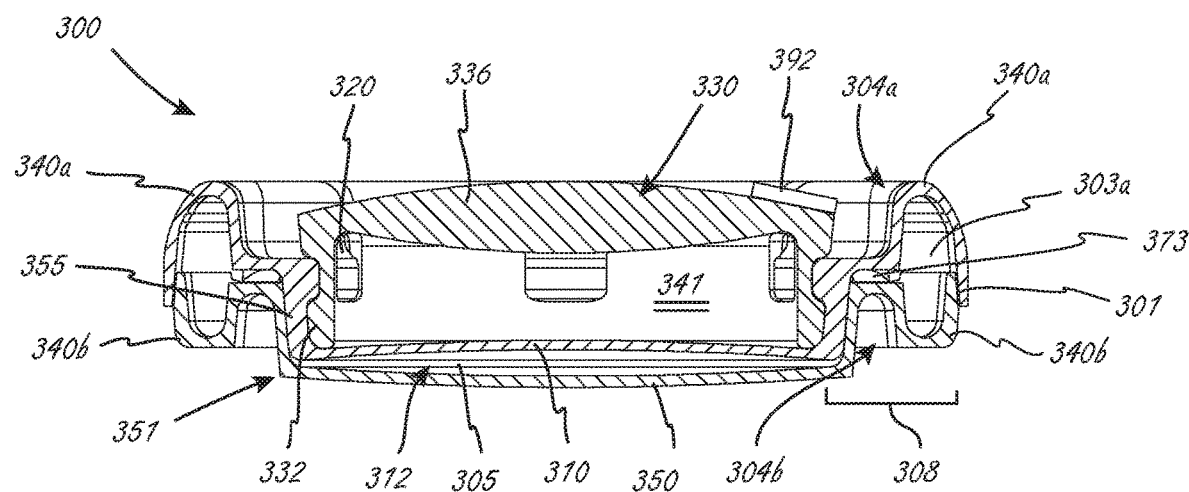
FIG. 2B illustrates a cross-sectional view of an AIOL having a pressure sensor embedded in a coating of the fixed lens structure and configured in accordance with still another embodiment of the present technology.

FIG. 2B illustrates an AIOL 300 configured in accordance with still another embodiment of the present technology. The AIOL 300 has many or all of the same features of AIOL 100 described above with respect to FIGS. 1A-1D. For example, like reference numbers between FIG. 2B and FIGS. 1A-1D indicate identical or similar features (e.g., fixed structure 330 v. fixed lens structure 130 The AIOL 300 comprises a pressure sensor 392 and/or associated electronics at least partially embedded in a coating of some portion of the AIOL 300. For example, the fixed lens assembly 330 can include a coating configured to affix the sensor 392 and/or electronics to the AIOL. The pressure sensor 392 can include a hollow portion constructed from a flexible and/or resilient material. In some embodiments, the hollow portion of the pressure sensor 392 is configured to operate in the same or a similar manner to the pressure sensor 390 described above. In some embodiments, the pressure sensor 392 (or any other pressure sensor described herein) includes microelectromechanical system (MEMS) components. For example, the pressure sensor 392 can include transducers and associate electronic circuits configured to operate the pressure sensor 392. In some embodiments, the pressure sensor 392 (or any other pressure sensor described herein) is configured to transmit signals (e.g., pressure readings, capacitance values, etc.) out from the eye using radiofrequency, magnetic resonance, and/or Bluetooth®.

Figure 2C:
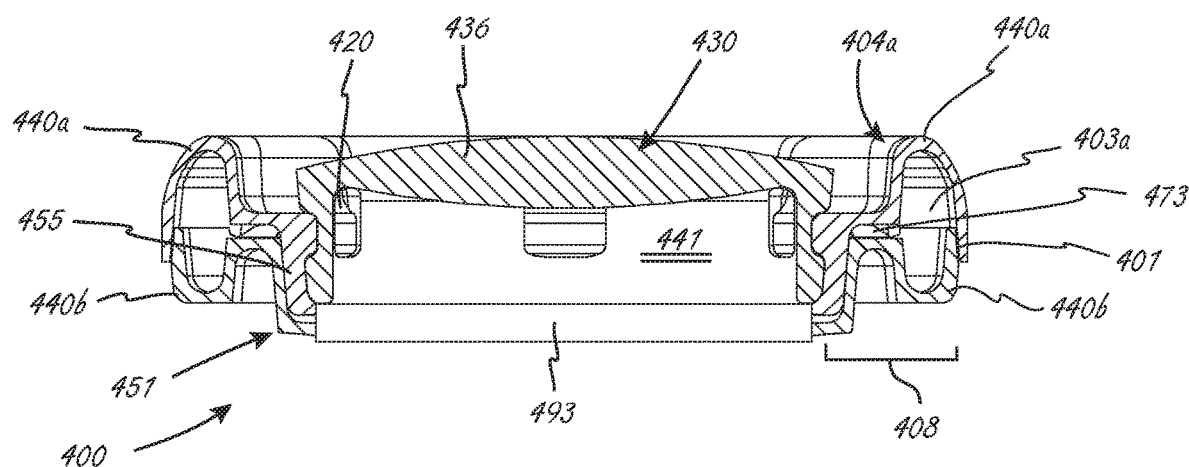
FIG. 2C illustrates a cross-sectional view of an AIOL having a pressure sensor assembly in place of an accommodating lens in accordance with another embodiment of the present technology.

FIG. 2C illustrates an embodiment of an AIOL 400 configured in accordance with another embodiment of the present technology that include many features of the AIOL 100 described above with respect to FIGS. 1A-1D, but does not include an accommodating lens portion. Like reference numbers between FIG. 2C and FIGS. 1A-1D indicate identical or similar features (e.g., fixed structure 430 v. fixed lens structure 130). In the present embodiment, a pressure sensor assembly 493 can be substituted for the accommodating lens. The pressure sensor assembly 493 can include one or more of the specific pressure sensors disclosed herein. The pressure sensor assembly 493 may also include electronics associated with the pressure sensor.

Figure 2D:
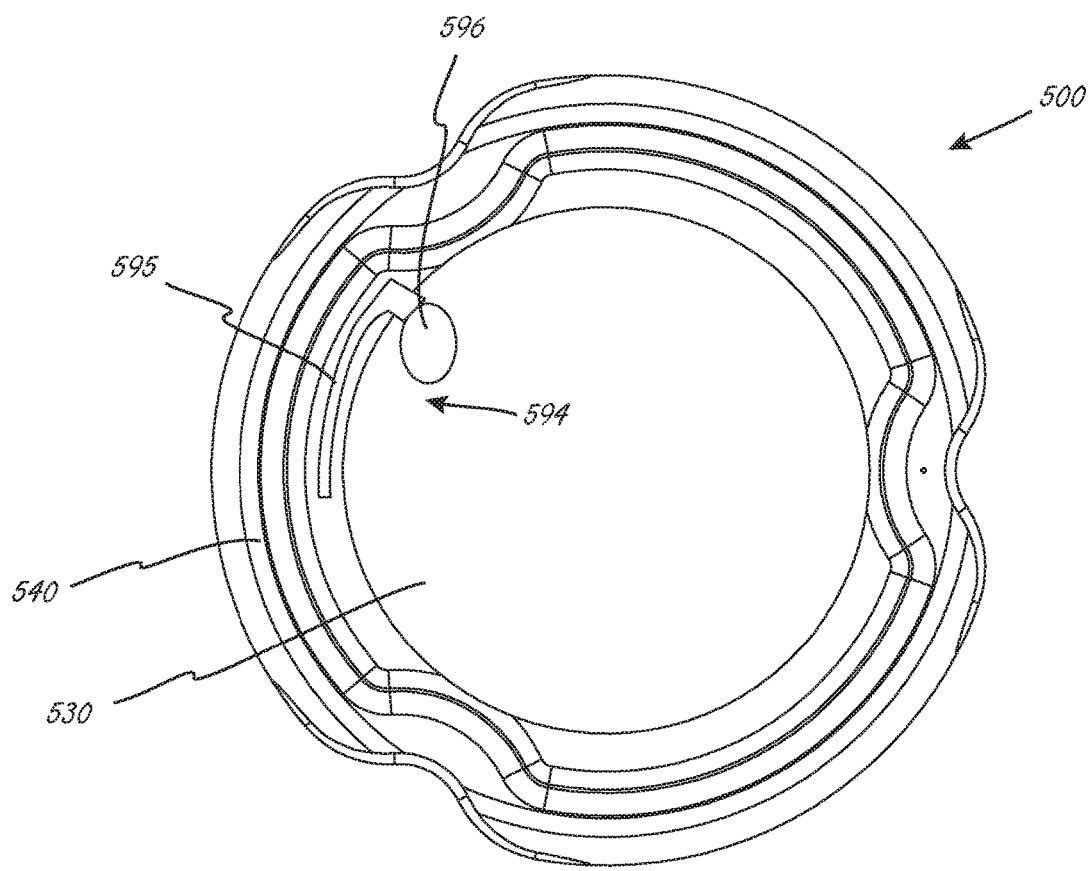
FIG. 2D illustrates an anterior-posterior elevation view of an AIOL having a Bourdon tube pressure sensor and configured in accordance with an embodiment of the present technology.

FIG. 2D illustrates an AIOL 500 configured in accordance with yet another embodiment of the present technology. The AIOL 500 has many or all of the same features of AIOL 100 described above with respect to FIGS. 1A-1D. For example, like reference numbers between FIG. 2D and FIGS. 1A-1D indicate identical or similar features (e.g., fixed structure 530 v. fixed lens structure 130). As illustrated, the AIOL 500 includes a Bourdon tube 594 configured to monitor IOP and/or pressure within the capsule of the patient's eye. The Bourdon tube 594 can include a tube portion 595 configured to (a) increase in curvature in response to a reduction in pressure within the tube 595 and (b) straighten in response to a decrease in pressure within the tube 595. The tube portion 595 can be connected to fluid reservoir 596 (shown schematically). The fluid reservoir 596 can be configured to contract in response to increased pressure within the eye capsule and to expand in response to decreased pressure within the eye capsule. In some embodiments, the curvature of the tube portion 595 is observable from outside of the eye, allowing a care provider or patient to monitor pressure. In some embodiments, the tube portion 595 is connected to a gauge, electronics, or other components configured to visually or electronically indicate a pressure reading based on the deflection of the tube portion 595. In some embodiments, the tube portion 595 of the Bourdon tube 594 is in direct fluid communication with the eye capsule when implanted.

Figure 2E:
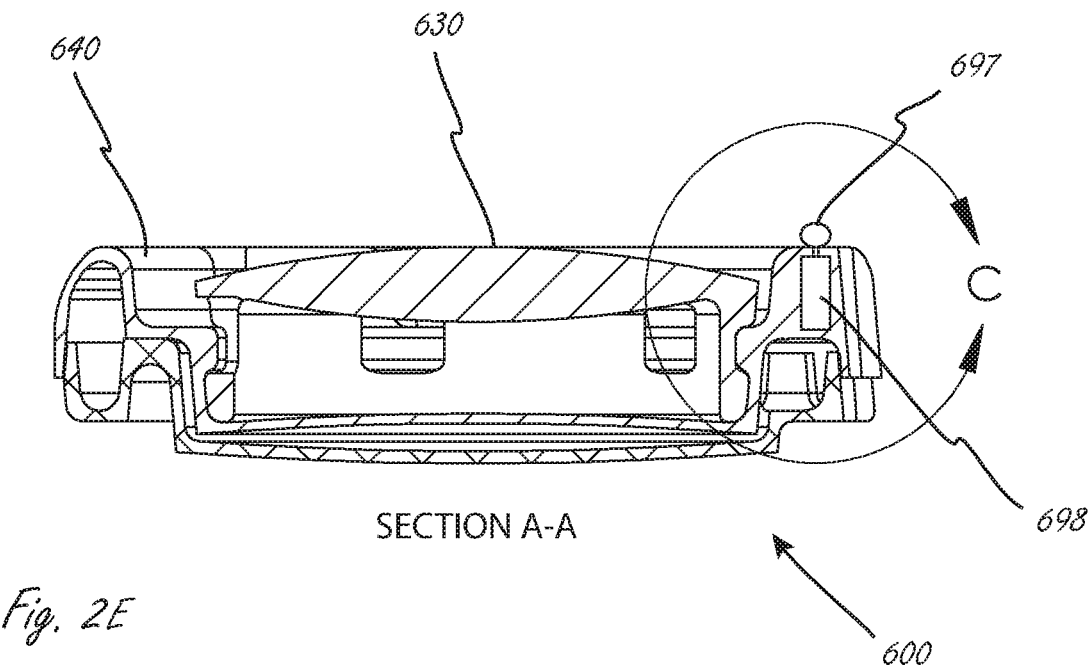
FIG. 2E illustrates a cross-sectional view of an AIOL having an internal reservoir and a pressure sensor attached thereto in accordance with another embodiment of the present technology.
Figure 2F:
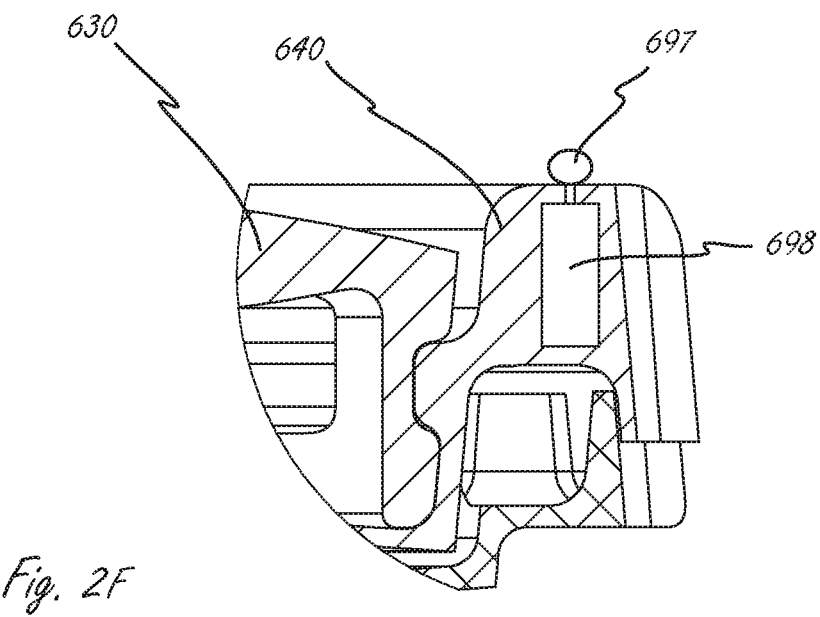
FIG. 2F illustrates a close-up cross-sectional view of the pressure sensor and reservoir of the AIOL of FIG. 2E.

FIGS. 2E-2F illustrate an AIOL 600 configured in accordance with an embodiment of the present technology. The AIOL 600 has many or all of the same features of AIOL 100 described above with respect to FIGS. 1A-1D. For example, like reference numbers between FIGS. 2E-2F and FIGS. 1A-1D indicate identical or similar features (e.g., fixed structure 630 v. fixed lens structure 130). As illustrated, the AIOL 600 comprises a pressure sensor 697 connected to a reservoir 698 (e.g., a sensor reservoir) within a portion of an accommodating structure 640 of the lens. The reservoir 698 can be fluidly isolated or separate from any other fluid reservoirs in the accommodating structure 640. The pressure sensor 697 can be configured to expand and contract in response to pressure changes within the eye (e.g., IOP and/or pressure within the eye capsule) when the AIOL is implanted. Expansion/contraction of the pressure sensor 697 can be viewable by an optical instrument from the outside of the eye to determine IOP within the eye.

Some or all of the pressure sensors described herein can use high molecular weight gases within flexible portions of the pressure sensors. Using high molecular weight gases, for example, is expected to reduce leakage or other passage of the gases through the pressure sensor material during the life of the sensor.

In some embodiments described herein, the pressure sensors (or portions thereof) are viewable from outside of the eye. For example, some of the pressure sensors described herein can be viewed or imaged when the eye is dilated or undilated, either during or after implantation of the AIOL in the patient's eye. In some such embodiments, cameras or other optical devices can capture images of the pressure sensors. These images can be taken at home, in a caregiver's office, at a hospital, or elsewhere and used to allow for measurement of the IOP in the eye. Allowing for periodic and low-maintenance monitoring of IOP can allow for earlier identification of irregularities in a person's TOP and can facilitate early diagnosis of conditions such as glaucoma.

Drug Delivery

For some patients, it may be desirable to deliver drugs or other therapeutic agents to the eye in addition to the implantation of an AIOL. Such drugs can be used to accelerate the patient's recovery from the implantation surgery, to treat a preexisting condition or disease (e.g., glaucoma), and/or to otherwise provide therapy or treatment to the patient. Previously, drugs and other therapeutic agents were delivered to the patient via needles, syringes, topical agents, eyedrops, and other means of delivering agents to the patient from an external source. In some applications, it is desirable to deliver drugs/therapeutic agents to the patient's eye without further procedures after the implantation surgery.

In some embodiments, the drug or other therapeutic agent includes one or more pharmaceuticals, proteins, peptides, antibodies or antibody fragments, enzymes, growth factors, vitamins, hormones, steroids, nucleic acids (e.g., DNA, RNA, oligonucleotides) or nucleic acid analogs, lipids, polysaccharides, polymers, particles (e.g., nanoparticles, microparticles), or a combination thereof. In some embodiments, the drug or other therapeutic agent includes one or more prostaglandins or prostaglandin analogs, prostamides or prostamide analogs, beta blockers, alpha-adrenergic agonists, carbonic anhydrase inhibitors (CAIs), Rho kinase inhibitors, cholinergic agents, miotic agents, mydriatics, cycloplegics, anesthetics, anti-infective agents, anti-inflammatory agents, anti-proliferative agents, anti-angiogenesis agents, anti-allergic agents, or a combination thereof.

In some embodiments, an anesthetic can be used as a therapeutic agent associated with an AIOL. The anesthetic can be, for example, a slow-release anesthetic configured to release over a course of days or weeks. An antibiotic compound can be used in or on an AIOL to reduce the risk of infection during after implantation of the AIOL into the eye capsule of a patient. Such antibiotics can be slow-release.

Various methods can be used to load an AIOL with one or more drugs or other therapeutic agents configured to instantly or gradually release to the eye structures surrounding the AIOL. In some embodiments, one or more portions of the AIOL (e.g., all or a portion of the fixed lens structure and/or the accommodating lens structure) are coated with a drug or other therapeutic agent, e.g., by dipping, spraying, spin-coating, depositing, grafting, layering, 3D printing, etc. Alternatively or in combination, one or more portions of the AIOL can be impregnated with a drug or other therapeutic agent, e.g., by immersing or soaking the AIOL thereof in a solution of the drug or other therapeutic agent. For example, in embodiments where the AIOL is formed from a hydrophilic material, the AIOL can be soaked in a solution of a hydrophilic drug or other therapeutic agent. The fixed lens assembly or fixed lens structure of one or more embodiments can be impregnated/soaked in a solution comprising a therapeutic agent. The soaked/impregnated fixed lens assemblies/structures can be replaceable (e.g., they can be replaced at a predetermined time and/or when the therapeutic agent is exhausted). Alternatively or in combination, the AIOL can include one or more structures (e.g., a reservoir, chamber, bladder, etc.) configured to retain the drug or other therapeutic agent (e.g., in solid, liquid, or gaseous form).

FIGS. 3A-3D, for example, illustrate an embodiment of an AIOL 700 with a drug reservoir configured in accordance with an embodiment of the present technology. The AIOL 700 has many or all of the same features of AIOL 100 described above with respect to FIGS. 1A-1D. For example, like reference numbers between FIGS. 3A-3D and FIGS. 1A-1D indicate identical or similar features (e.g., fixed structure 730 v. fixed lens structure 130). As best illustrated in FIGS. 3B and 3D, the AIOL 700 includes a drug-delivery structure built into the accommodating structure 740 of the AIOL 700. In some embodiments, the drug-delivering structure is a reservoir 701 (e.g., a drug reservoir) built into or onto the AIOL 700. For example, fixed lens structure 730 and/or accommodating lens structure 740 can include the reservoir. As illustrated, a reservoir 701 can be formed in a portion of the accommodating structure 740 (e.g., in an otherwise solid portion of the accommodating structure 740). In some embodiments, the fixed lens structure 730 can include a reservoir 702 instead of or in addition to the reservoir 701 in the accommodating structure 740. Building the drug-delivery structure into or onto a solid portion of the accommodating structure 740 or fixed structure 730 can reduce or eliminate undesired impact on the bellowing/accommodating function of the AIOL 700. The reservoir(s) 701, 702 can be at least partially filled with a drug (e.g., a solid, liquid, and/or gaseous drug). The reservoir 701 can be in fluid communication with an exterior of the AIOL via one or more ports 703. Similarly, the reservoir 702 in the fixed lens structure 730 can include one or more ports 704 to facilitate fluid communication between the reservoir 702 and an exterior of the AIOL. The reservoir(s) 701, 702 can be fluidly isolated from other reservoirs or volumes in the accommodating structure 740.

The one or more ports 703, 704 may be plugged or otherwise stopped prior to and/or during implantation of the AIOL 700 into the patient's eye. In some embodiments, for example, the ports 703, 704 are stopped with a sacrificial structure (e.g., a dissolvable structure, a meltable structure, an ablatable structure, a biodegradable structure, or otherwise) configured to provide access between the reservoir(s) 701, 702 and the eye capsule or other surrounding eye structure after implantation. In some embodiments, the ports 703, 704 are on an anterior side of the AIOL 700 when the AIOL 700 is implanted. Positioning the ports 703, 704 on the anterior side of the AIOL 700 can allow for easier refill of the reservoir(s) 701, 702 and, in some embodiments, can allow the reservoir 701 to be refilled without removing the AIOL 700 from the eye. In other embodiments, the ports 703 can be omitted, and one or more walls of the reservoir 701 can include pores, a semi-permeable membrane, or other features configured to allow the drug to elute therethrough after implantation.

In some embodiments, the reservoir(s) 701, 702 are refillable. For example, the reservoir(s) 701, 702 may be refilled via a needle or syringe from outside of the eye. In some embodiments, the reservoir(s) 701, 702 are refilled with a solid, liquid, or mixture thereof (e.g., a suspension). In some embodiments, the fixed lens structure 730 may be exchanged for another fixed lens structure 730 with a filled reservoir 702. This exchange can occur while the accommodating structure 740 is positioned within the eye.

In some embodiments, the drug itself is a time-release compound or other composition that delivers therapy over an amount of time. For example, the reservoir(s) 701, 702 may be filled with a solid, gel, or other drug composition configured to release slowly through the port(s) 703, 704 of the drug-delivery structure. In some embodiments, the reservoir(s) 701, 702 is segregated into a plurality of chambers by sacrificial structure (e.g., walls, membranes, etc.) that are configured to delay release of the drugs within the plurality of chambers and/or to deliver drugs in a predetermined order.

In some embodiments, the accommodating structures described herein form a base structure onto/into which other structures can be installed. For example, the accommodating structures 140, 240, 340, 440, 540, 640, 740 (i.e., accommodating bases) can be configured to receive a structure (e.g., a secondary structure) other than a fixed lens assembly. Such structures can include, for example, sensor assemblies, powered lenses, and/or light-adjustable lenses. The structures can include, in some embodiments, the above-described sensors and/or fixed lenses. The use of an accommodating base to support such structures can allow for accommodative AIOL functionality with the additional functions provide by the above-listed structures. The accommodating bases can facilitate swapping out of one removable structure for another, allowing for a customizable platform with which many different structures or combinations of structures can be coupled.

The multipart AIOL devices described herein may be implanted by preparing the eye and removing the native lens from the capsule in any appropriate manner. The fluid-filled structure (e.g., the accommodating lens structure) may then be placed in the capsule of the eye. In some embodiments, a secondary structure is connected to the fluid-filled structure after the fluid-filled structure is placed in the capsule. In some embodiments, the patent is evaluated for a base optical power and/or astigmatic correction, and a fixed lens is selected to provide the desired based power or astigmatic correction for the fluid-filled structure in the implanted state in the capsule of the eye. The specific fixed lens to provide the post-implant base power or astigmatic correction is then inserted into the previously implanted fluid-filled structure of the AIOL. The chosen fixed lens may then be coupled to the fluid-filled structure within the eye capsule. This is possible in the AIOLs of the present technology because the fixed lenses are attached to the anterior first component of the AIOLs. As described above, one or more of the fluid-filled accommodating structure or fixed lens may each be flexible such that they may be reconfigured (e.g., folded) to a reduced-profile delivery configuration for delivery into the lens capsule. In some instances, it may be required to make a further correction to the fixed portion after the time of the surgery. Such instance may occur anywhere from days to years after the surgery. At such times, the patient may return to the physician and the fixed lens may be replaced with a new fixed lens having a different optical power or other prescription. In such instances, the new prescription may be characterized prior to or after removal of the original fixed lens. In some instances, the new fixed lens may be fabricated and implanted at the time of the examination, in others the patient may return for implantation of the fixed lens sometime after the examination.

Several embodiments of the present technology are directed to a kit having an accommodating structure and a first fixed lens that has no optical base power. The kit can further include one or more second fixed lenses having various based powers or other optical properties. In practice, the accommodating structure can be implanted into the native eye capsule, and then the first fixed lens can be coupled to the accommodating structure. The optical properties of the implanted accommodating structure can then be assessed in situ with the first fixed lens in place to determine the desired optical properties of the fixed lens. If the optical properties of the assembled accommodating structure and first fixed lens without a base power are appropriate, then the system can remain implanted without additional changes. However, if a different base power or some other optical property is desired (e.g., toric or other asymmetrical optics), then the first fixed lens without a base power can be replaced with a second fixed lens having the desired optical properties based on the optical properties of the implanted accommodating portion with a fixed lens attached.

In some embodiments, the fixed portion of the AIOL may be fabricated from materials different from the accommodating portion. Such materials include hydrophilic or hydrophobic methacrylate or silicones and any other materials traditionally used in non-accommodating IOLs. The fixed lens may be fabricated from materials harder than those used for the accommodating portion.

Any of the features of the intraocular lens systems described herein may be combined with any of the features of the other intraocular lenses described herein and vice versa. Additionally, several specific examples of embodiments in accordance with the present technology are set forth below in the following examples.

EXAMPLES

Several aspects of the present technology are set forth in the following examples.

1. An AIOL, comprising:
an accommodating lens structure having an optical power;
a fixed lens structure having a fixed optical power and removably connected to the accommodating lens; and
one or more pressure sensors connected to one or both of the accommodating lens structure and the fixed lens structure;
wherein the one or more pressure sensors are configured to measure an intraocular pressure within an eye in which the AIOL is implanted.
2. The AIOL of example 1 wherein the one or more pressure sensors are configured to deform in response to changes in intraocular pressure within the eye in which the AIOL is implanted.
3. The AIOL of examples 1 or 2 wherein the one or more pressure sensors are viewable from outside of the eye when the AIOL is implanted within the eye.
4. The AIOL of any of examples 1-3 wherein the one or more pressure sensors comprise a pressure sensor embedded in a coating on the AIOL, a Bourdon tube, and/or a toroidal sensor.
5. The AIOL of any of examples 1-4 wherein the accommodating lens structure is configured to change shape in response to compression of the accommodating lens structure by ciliary muscles in the eye in which the AIOL is implanted, wherein a change in shape of the accommodating lens structure changes the optical power of the accommodating lens structure.
6. The AIOL of any of examples 1-5 wherein the intraocular pressure of the eye in which the AIOL is implanted is measurable based on a visual inspection of the one or more pressure sensors from outside of the eye.
7. The AIOL of any of examples 1-6 wherein the one or more pressure sensors are configured to transmit signals via radio frequency, magnetic resonance, and/or Bluetooth®.
8. The AIOL of any of examples 1-7 wherein the pressure sensor is fixedly attached to the fixed lens structure.
9. The AIOL of any of examples 1-8 wherein the fixed lens structure has an optical axis, and wherein at least a portion of the pressure sensor is positioned in a space between the fixed lens structure and the accommodating lens structure, as measured perpendicular to the optical axis.
10. The AIOL of any of examples 1-9 wherein the pressure sensor comprises microelectromechanical systems.
11. The AIOL of any of examples 1-10 wherein the accommodating lens structure comprises an outer fluid reservoir and a fluid accommodating lens in fluid communication with the outer fluid reservoir, and wherein the outer fluid reservoir is configured to transfer fluid into the fluid accommodating lens in reaction to compressive forces on the outer fluid reservoir.
12. The AIOL of any of examples 1-11 wherein the accommodating lens structure comprises a sensor reservoir, and wherein the pressure sensor is in fluid communication with the sensor reservoir.
13. The AIOL of example 12 wherein the sensor reservoir is fluidly separate from the outer fluid reservoir.
14. An AIOL comprising:
an accommodating lens structure having an adjustable optical power;
a fixed lens structure having a fixed optical power and removably connected to the accommodating lens; and
one or more drug delivery structures connected to one or both of the accommodating lens structure and the fixed lens structure;
wherein the one or more drug delivery structures are configured to deliver one or more drugs or other therapeutic agents to an eye in which the AIOL is implanted.
15. The AIOL of example 14 wherein the one or more drug delivery structures comprise a drug reservoir in or on one or both of the fixed lens and the accommodating lens structure.
16. The AIOL of examples 14 or 15 wherein the accommodating lens structure comprises an outer fluid reservoir and a fluid accommodating lens in fluid communication with the outer fluid reservoir, and wherein the outer fluid reservoir is configured to transfer fluid into the fluid accommodating lens in reaction to compressive forces on the outer fluid reservoir.

17. The AIOL of example 16 wherein the drug reservoir is within the accommodating lens structure and fluidly separate from the outer fluid reservoir.
18. The AIOL of any of examples 15-17 wherein the one or more drug delivery structures comprise a port between the drug reservoir and an exterior of the AIOL.
19. The AIOL of example 18 wherein the port is stopped with a sacrificial structure prior to implantation of the AIOL in the eye, and wherein the sacrificial structure is configured to dissolve when the AIOL is implanted in the eye.
20. The AIOL of examples 18 or 19 wherein the port is positioned on an anterior side of the AIOL when the AIOL is implanted in an eye.
21. The AIOL of any of examples 14-19 wherein the one or more drug delivery structures comprises a soluble drug or therapeutic agent.
22. The AIOL of any of examples 14-21 wherein the one or more therapeutic agents comprise one or more prostaglandins or prostaglandin analogs, prostamides or prostamide analogs, beta blockers, alpha-adrenergic agonists, carbonic anhydrase inhibitors (CAIs), Rho kinase inhibitors, cholinergic agents, miotic agents, mydriatics, cycloplegics, anesthetics, anti-infective agents, anti-inflammatory agents, anti-proliferative agents, anti-angiogenesis agents, anti-allergic agents, or a combination thereof.
23. The AIOL of any of examples 14-21 wherein the one or more therapeutic agents are antibiotics.
24. An AIOL comprising:
an accommodating lens structure having an adjustable optical power;
a fixed lens structure having a fixed optical power and removably connected to the accommodating lens; and
a therapeutic agent impregnated into at least a portion of the accommodating structure and/or the fixed lens structure.
25. The AIOL of example 24 wherein the therapeutic agent is soaked into a hydrophilic portion of the accommodating structure and/or of the fixed lens structure.
26. The AIOL of examples 24 or 25 wherein the therapeutic agent is an anesthetic compound and/or an antibiotic compound.
27. An AIOL comprising:
an accommodating lens structure having an accommodating optical power; and a secondary structure removably connected to the accommodating lens;
wherein—
the accommodating lens structure is configured to adjust the accommodating optical power in response to radial forces from the capsule of a patient.
28. The AIOL of example 16 wherein the secondary structure is a sensor assembly, a powered lens and/or a light-adjustable lens.
29. The AIOL of examples 27 or 28, wherein the accommodating lens structure comprises an outer fluid reservoir and a fluid accommodating lens in fluid communication with the outer fluid reservoir, and wherein the outer fluid reservoir is configured to transfer fluid into the fluid accommodating lens in reaction to compressive forces on the outer fluid reservoir.
30. The AIOL of example 29 wherein accommodating lens structure comprises an optical axis, and wherein the outer fluid reservoir is annular and surrounds the fluid accommodating lens when observed parallel to the optical axis.
31. The AIOL of example 30 wherein the accommodating lens structure comprises a first component having a first optical structure and a second component coupled with the first component and having a second optical structure aligned with the first optical structure along the optical axis, and wherein the accommodating lens structure comprises an inner wall comprising a portion of at least one of the first component and the second component, the inner wall comprising one or more openings providing fluid communication between the outer fluid reservoir and the fluid accommodating lens.
32. The AIOL of example 27 wherein the secondary structure is a lens having a fixed optical power and a pressure sensor.
33. The AIOL of example 27 wherein secondary structure is configured to be removably connected to the accommodating lens structure after the accommodating lens structure is implanted in an eye.

CONCLUSION

The above detailed description of embodiments of the technology are not intended to be exhaustive or to limit the technology to the precise form disclosed above. Although specific embodiments of, and examples for, the technology are described above for illustrative purposes, various equivalent modifications are possible within the scope of the technology as those skilled in the relevant art will recognize. For example, any of the features of the AIOLs described herein may be combined with any of the features of the other AIOLs described herein and vice versa. Moreover, although steps are presented in a given order, alternative embodiments may perform steps in a different order. The various embodiments described herein may also be combined to provide further embodiments.

From the foregoing, it will be appreciated that specific embodiments of the technology have been described herein for purposes of illustration, but well-known structures and functions associated with AIOLs have not been shown or described in detail to avoid unnecessarily obscuring the description of the embodiments of the technology. Where the context permits, singular or plural terms may also include the plural or singular term, respectively.

Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the term "comprising" is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An adjustable intraocular lens (AIOL), comprising:
   an accommodating lens structure having an optical power;
   a fixed lens structure having a fixed optical power and removably connected to the accommodating lens structure; and
   a pressure sensor connected to one or both of the accommodating lens structure and the fixed lens structure,
   wherein the pressure sensor is configured to measure an intraocular pressure within an eye in which the AIOL is implanted, and
   wherein the pressure sensor is viewable from outside of the eye when the AIOL is implanted within the eye.

2. The AIOL of claim 1 wherein the fixed lens structure is configured to be removably connected to the accommodating lens structure after the accommodating lens structure is implanted in the eye.

3. The AIOL of claim 1 wherein the pressure sensor is configured to deform in response to changes in intraocular pressure within the eye in which the AIOL is implanted.

4. The AIOL of claim 1 wherein the pressure sensor comprises a pressure sensor embedded in a coating on the AIOL, a Bourdon tube, and/or a toroidal sensor.

5. The AIOL of claim 1 wherein the intraocular pressure of the eye in which the AIOL is implanted is measurable based on a visual inspection of the pressure sensor from outside of the eye.

6. The AIOL of claim 1 wherein the accommodating lens structure comprises an outer fluid reservoir and a fluid accommodating lens in fluid communication with the outer fluid reservoir, and wherein the outer fluid reservoir is configured to transfer fluid into the fluid accommodating lens in reaction to compressive forces on the outer fluid reservoir.

7. The AIOL of claim 6 wherein the accommodating lens structure comprises a sensor reservoir, and wherein the pressure sensor is in fluid communication with the sensor reservoir.

8. The AIOL of claim 7 wherein the sensor reservoir is fluidly separate from the outer fluid reservoir.

9. The AIOL of claim 1 wherein the pressure sensor is viewable through the fixed lens structure and from outside of the eye when the AIOL is implanted within the eye.

10. An adjustable intraocular lens (AIOL), comprising:
    an accommodating lens structure having an optical power;
    a fixed lens structure having a fixed optical power and removably connected to the accommodating lens structure; and
    a pressure sensor fixedly attached to the fixed lens structure, wherein the pressure sensor is configured to measure an intraocular pressure within an eye in which the AIOL is implanted.

11. The AIOL of claim 10 wherein pressure sensor is configured to transmit signals via radio frequency, magnetic resonance, and/or Bluetooth®.

12. The AIOL of claim 10 wherein the pressure sensor comprises microelectromechanical systems.

13. The AIOL of claim 10 wherein the fixed lens structure is positioned between the pressure sensor and at least a portion of the accommodating lens structure.

14. The AIOL of claim 10 wherein the pressure sensor is fixedly attached to an outer perimeter of the fixed lens structure.

15. The AIOL of claim 10 wherein:
    the fixed lens structure includes an optical portion that defines an outer perimeter and is configured to provide the fixed optical power, and
    the pressure sensor is positioned to extend around at least a portion of the outer perimeter.

16. An adjustable intraocular lens (AIOL), comprising:
    an accommodating lens structure having an optical power;
    a fixed lens structure removably connected to the accommodating lens structure, wherein the fixed lens structure has an optical axis and a fixed optical power; and
    a pressure sensor connected to one or both of the accommodating lens structure and the fixed lens structure, wherein at least a portion of the pressure sensor is positioned in a space between the fixed lens structure and the accommodating lens structure, as measured perpendicular to the optical axis, and wherein the pressure sensor is configured measure an intraocular pressure within an eye in which the AIOL is implanted.

17. The AIOL of claim 16 wherein the accommodating lens structure comprises:
    an outer fluid reservoir;
    a fluid accommodating lens in fluid communication with the outer fluid reservoir; and
    an optical axis,
    wherein the outer fluid reservoir is annular and surrounds the fluid accommodating lens when observed parallel to the optical axis.

18. The AIOL of claim 16 wherein the accommodating lens structure is configured to change shape in response to compression of the accommodating lens structure by ciliary muscles in the eye in which the AIOL is implanted, wherein a change in shape of the accommodating lens structure changes the optical power of the accommodating lens structure.

19. The AIOL of claim 16 wherein:
    the fixed lens structure and/or the accommodating lens structure define an optical axis,
    the fixed lens structure includes an optical portion configured to provide the fixed optical power, and
    relative to the optical axis, the pressure sensor is positioned radially between the optical portion and the accommodating lens structure.

20. The AIOL of claim 16 wherein, at least while the AIOL is implanted within the eye, both the fixed lens structure and the pressure sensor are positioned anterior to at least a portion of the accommodating lens structure and configured to be removable from the eye separately from one another and from the accommodating lens structure.

* * * * *